US011124296B2

(12) United States Patent
Hefner et al.

(10) Patent No.: US 11,124,296 B2
(45) Date of Patent: Sep. 21, 2021

(54) FLYING WING AIRCRAFT HAVING FLIGHT AND STORAGE CONFIGURATIONS

(71) Applicant: Textron Innovations Inc., Providence, RI (US)

(72) Inventors: Levi Charles Hefner, Arlington, TX (US); Dakota Charles Easley, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 643 days.

(21) Appl. No.: 16/031,741

(22) Filed: Jul. 10, 2018

(65) Prior Publication Data

US 2020/0017211 A1 Jan. 16, 2020

(51) Int. Cl.
*B64C 29/02* (2006.01)
*B64C 39/02* (2006.01)
*B64D 27/26* (2006.01)
*B64D 31/06* (2006.01)

(52) U.S. Cl.
CPC ............ *B64C 39/024* (2013.01); *B64C 29/02* (2013.01); *B64D 27/26* (2013.01); *B64D 31/06* (2013.01); *B64C 2201/024* (2013.01); *B64C 2201/028* (2013.01); *B64C 2201/042* (2013.01); *B64C 2201/104* (2013.01); *B64C 2201/108* (2013.01); *B64C 2201/123* (2013.01); *B64C 2201/127* (2013.01); *B64C 2201/145* (2013.01); *B64C 2201/146* (2013.01); *B64C 2201/20* (2013.01); *B64D 2027/262* (2013.01)

(58) Field of Classification Search
CPC .............. B64C 39/10; B64C 2039/105; B64C 2201/028; B64C 27/52; B64C 29/02; B64C 11/46; B64C 1/30
See application file for complete search history.

(56) References Cited

U.S. PATENT DOCUMENTS

| 5,082,204 | A | 1/1992 | Croston |
| 6,860,449 | B1 | 3/2005 | Chen |
| 8,602,348 | B2 | 12/2013 | Bryant |
| 2005/0178879 | A1 | 8/2005 | Mao |
| 2008/0308685 | A1* | 12/2008 | Decker ................... B64C 17/06 244/53 R |
| 2014/0217229 | A1 | 8/2014 | Chan |

(Continued)

*Primary Examiner* — Timothy D Collins
*Assistant Examiner* — Terri L Filosi
(74) *Attorney, Agent, or Firm* — Lawrence Youst PLLC

(57) ABSTRACT

An unmanned aircraft system includes a flying wing airframe having leading and trailing edges with respective sweep angles. A thrust array is coupled to the airframe and includes first and second motor mounts each rotatably coupled to the leading edge. Each motor mount has first and second propulsion assemblies coupled to respective first and second distal ends thereof. A power system is operably associated with the thrust array and is operable to provide power to each propulsion assembly. A flight control system is operably associated with the thrust array and is operable to independently control the speed of each propulsion assembly. In a flight configuration of the system, each motor mount is substantially perpendicular with the leading edge such that the thrust array forms a two-dimensional thrust array. In a compact storage configuration of the system, each motor mount is substantially parallel with the leading edge.

20 Claims, 15 Drawing Sheets

(56) References Cited

U.S. PATENT DOCUMENTS

2015/0225071 A1    8/2015  Tighe
2017/0043870 A1*  2/2017  Wu ........................ B64C 39/024
2017/0283052 A1*  10/2017  Moshe ................ B64C 29/0033
2018/0281941 A1*  10/2018  Hutson ................. B64C 39/024

* cited by examiner

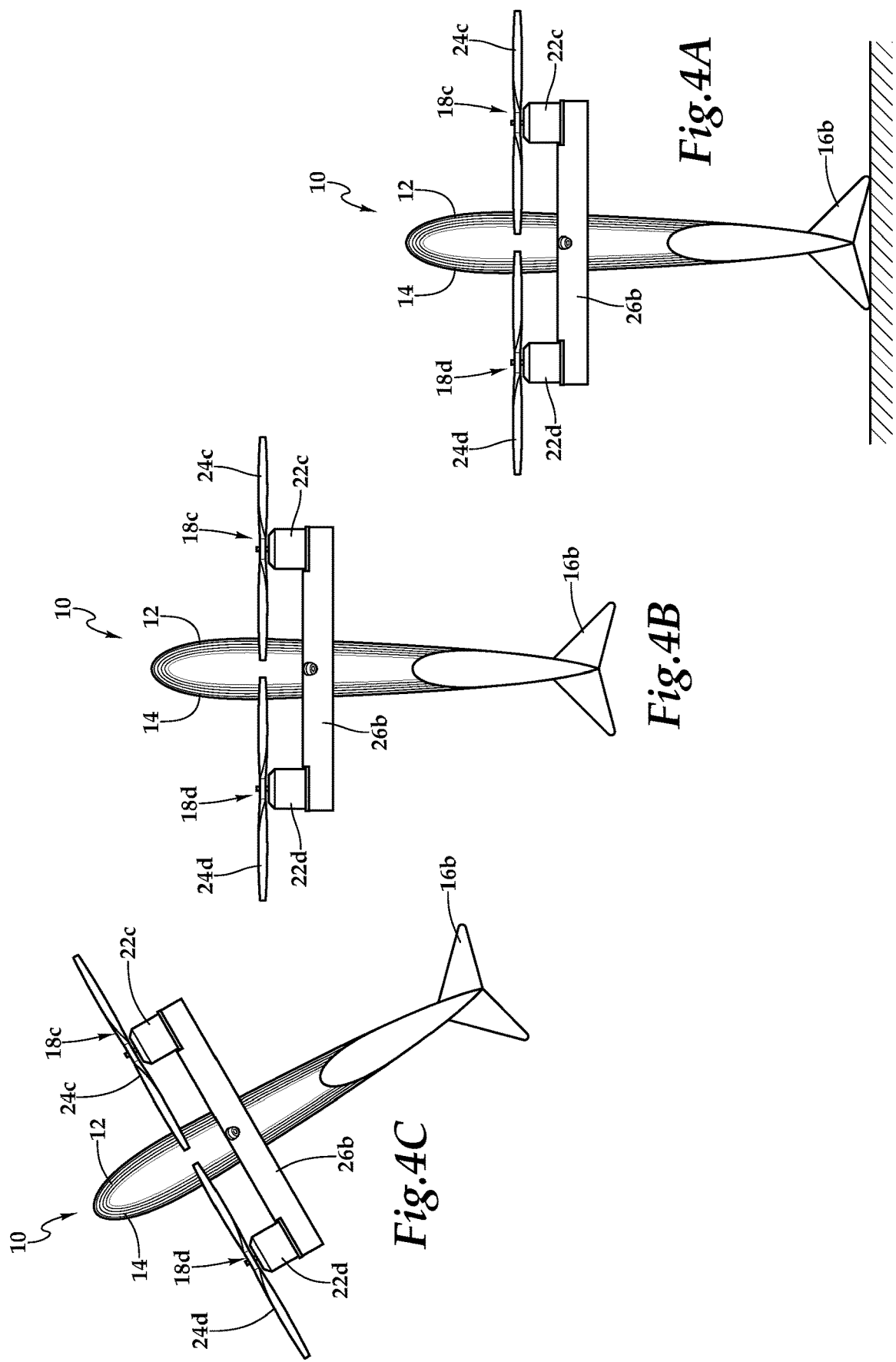

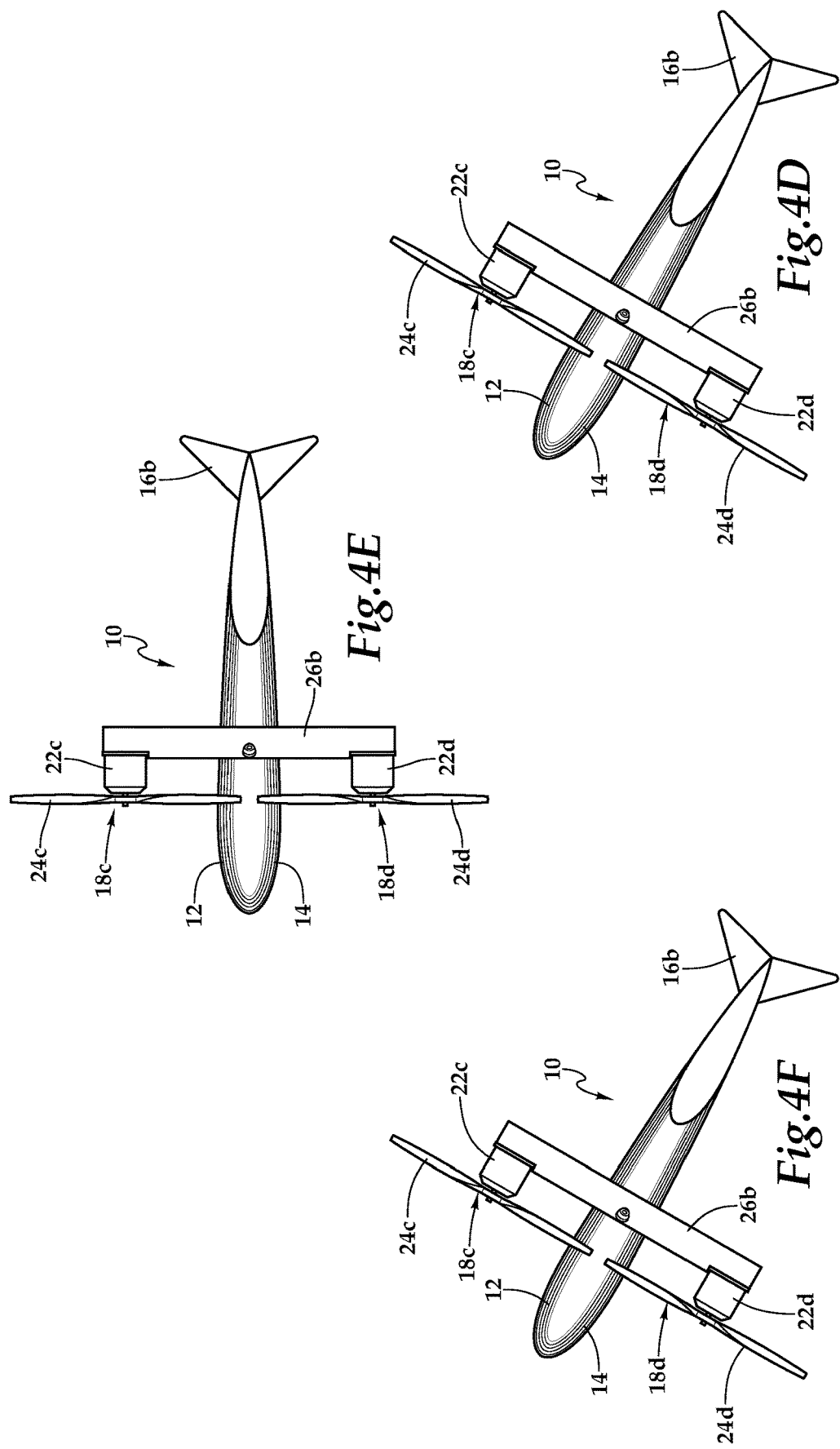

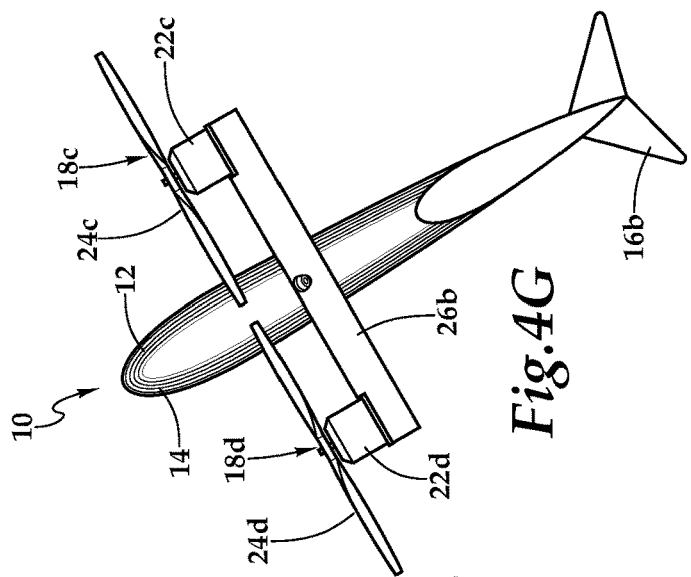
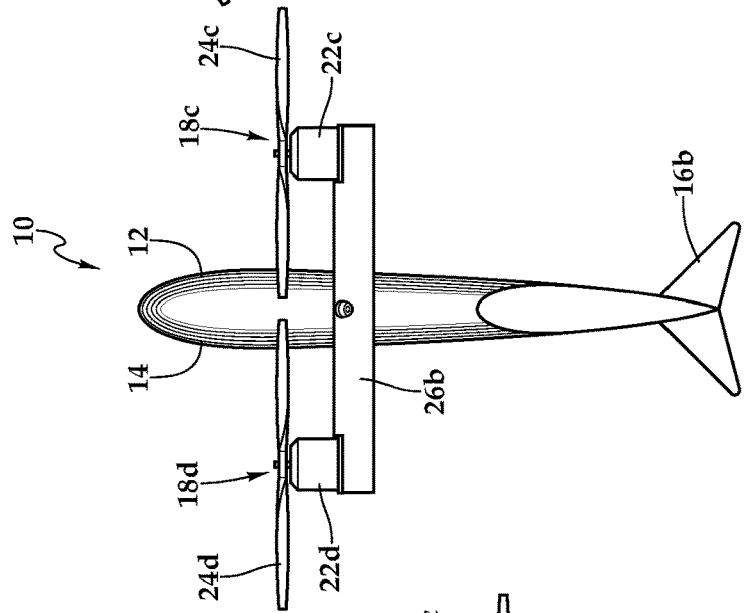
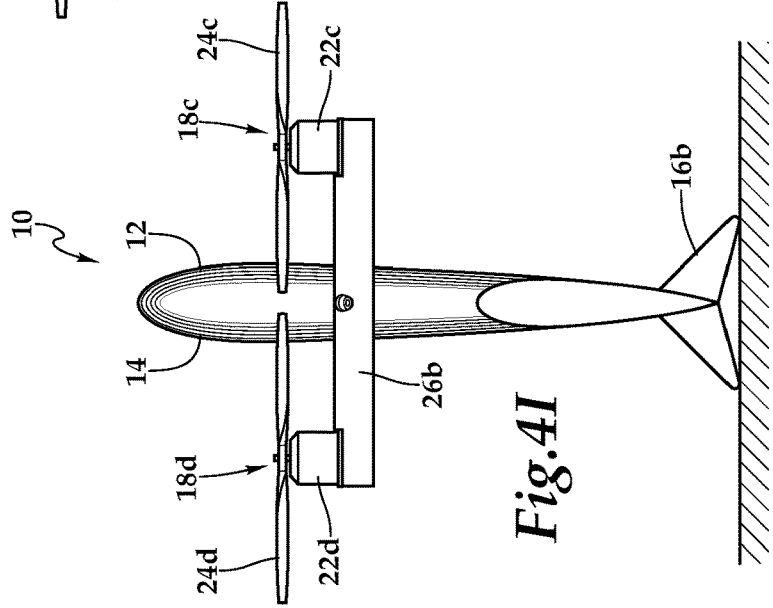

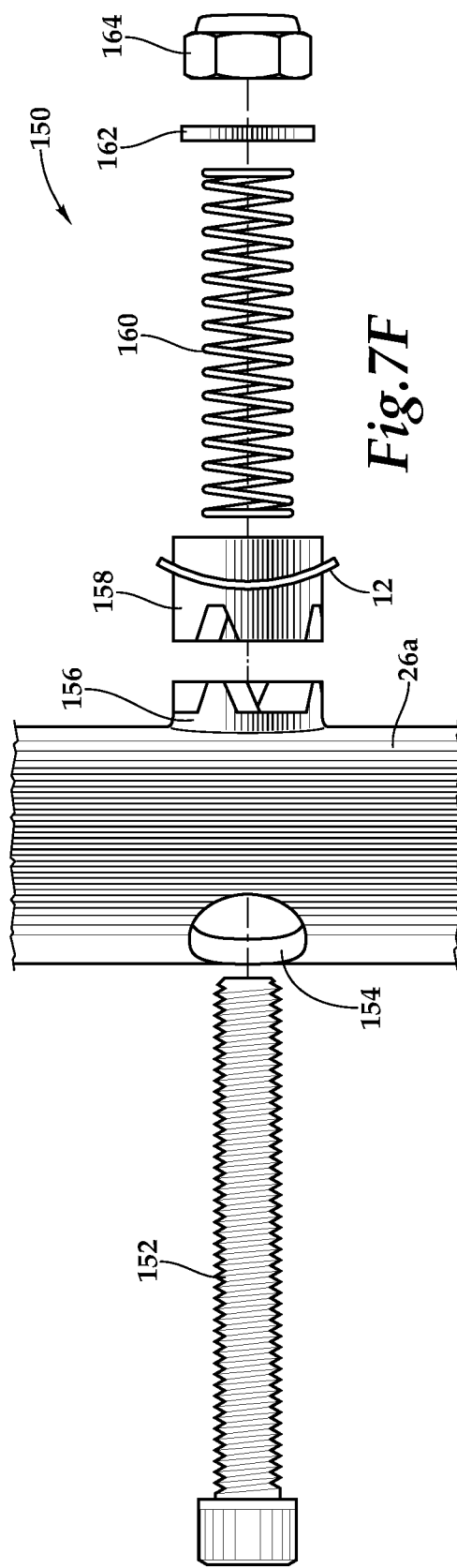
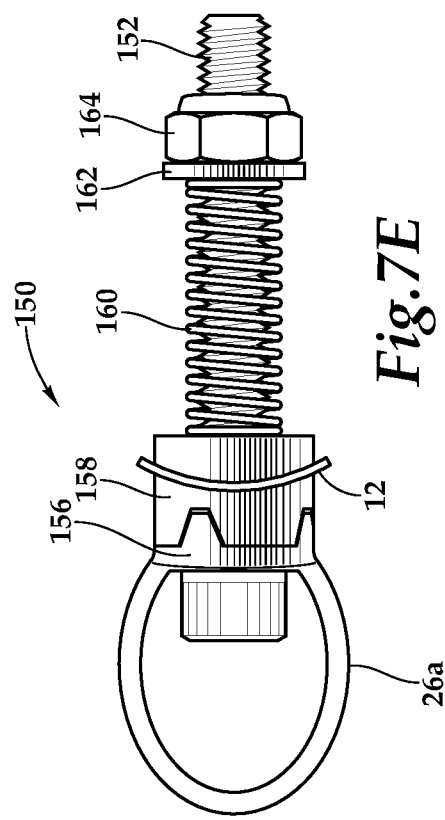
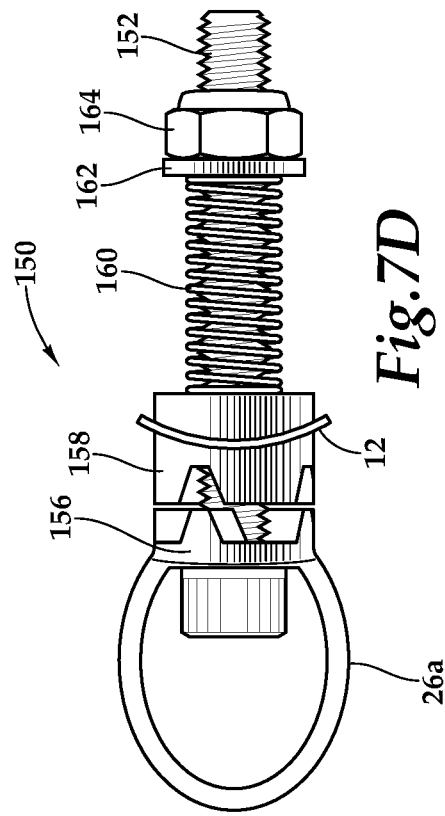

FLYING WING AIRCRAFT HAVING FLIGHT AND STORAGE CONFIGURATIONS

GOVERNMENT RIGHTS

This invention was made with government support under ARL CRADA 17-064 awarded by U.S. Army Research Laboratory. The government has certain rights in the invention.

TECHNICAL FIELD OF THE DISCLOSURE

The present disclosure relates, in general, to aircraft operable to transition between thrust-borne lift in a VTOL orientation and wing-borne lift in a flying wing orientation and, in particular, to unmanned aircraft systems operable to transition between a flight configuration having a two-dimensional distributed thrust array and a compact storage configuration.

BACKGROUND

Unmanned aircraft systems (UAS), also known as unmanned aerial vehicles (UAV) or drones, are self-powered aircraft that do not carry a human operator, uses aerodynamic forces to provide vehicle lift, are autonomously and/or remotely operated, may be expendable or recoverable and may carry lethal or nonlethal payloads. UAS may be used in military, commercial, scientific, recreational and other applications. For example, military applications may include intelligence, surveillance, target acquisition and reconnaissance missions as well as attack missions. Civil applications may include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

Recently, military organizations have indicated a desire for small unmanned aircraft systems that are operable as soldier borne sensors (SBS). Such soldier borne sensors should be easy to transport without putting a weight burden on the soldier and simple to deploy yet be capable of continuous flight during certain adverse conditions for minutes or hours. In addition, such soldier borne sensors should be capable of remote and/or autonomous flight in an operating theater of hundreds or thousands of meters including visual line of sight operations. Further, such soldier borne sensors should be capable of providing a dismounted soldier with real-time information relevant to the immediately surrounding area, enabling the soldiers to gain situational awareness over the most eminent threat and/or rapidly changing threats.

SUMMARY

In a first aspect, the present disclosure is directed to an unmanned aircraft system having a compact storage configuration and a flight configuration in which the system is operable for thrust-borne lift in a VTOL orientation and wing-borne lift in a flying wing orientation. The unmanned aircraft system includes an airframe having a leading edge, a trailing edge, a root chord, a first wingtip and a second wingtip. The leading edge extends from the root chord to each of the wingtips with a first sweep angle. The trailing edge extends from the root chord to each of the wingtips with a second sweep angle. The airframe has an airfoil cross-section along chord stations thereof. A thrust array is coupled to the airframe. The thrust array including a first motor mount rotatably coupled to the leading edge between the root chord and the first wingtip and a second motor mount rotatably coupled to the leading edge between the root chord and the second wingtip. Each of the motor mounts has first and second propulsion assemblies coupled to respective first and second distal ends thereof. An electric power system is operably associated with the thrust array and is operable to provide power to each of the propulsion assemblies. A flight control system is operably associated with the thrust array and is operable to independently control the speed of each of the propulsion assemblies. In the flight configuration, each of the motor mounts is substantially perpendicular with the leading edge such that the thrust array forms a two-dimensional distributed thrust array. In the compact storage configuration, each of the motor mounts is substantially parallel with the leading edge extending substantially at the first sweep angle.

In some embodiments, the first sweep angle is not congruent with the second sweep angle. For example, the first sweep angle may be greater than the second sweep angle. In certain embodiments, the airframe may have a quarter chord sweep angle of between about 20 degrees and about 40 degrees, a quarter chord sweep angle of between about 25 degrees and about 35 degrees or a quarter chord sweep angle of about 30 degrees. In some embodiments, each of the propulsion assemblies may include an electric motor and a rotor assembly with each of the rotor assemblies having a fixed pitch rotor assembly and/or at least two rotor blades. In certain embodiments, the motor mounts may be lockable relative to the leading edge of the airframe in the compact storage configuration and in the flight configuration. In such embodiments, the motor mounts may be lockable relative to the leading edge of the airframe at ninety degree increments.

In some embodiments, the electric power system may include one or more batteries and at least one power controller. In certain embodiments, the flight control system may be operable for autonomous flight control of the unmanned aircraft system. Alternatively or additionally, the flight control system may be operable to communicate with a remote station. In some embodiments, the unmanned aircraft system may include a sensor system such as a sensor array including one or more of an optical camera, a thermal camera, an infrared camera and a video camera. Alternatively or additionally, the sensor system may include an intelligence, surveillance and reconnaissance module. In certain embodiments, the unmanned aircraft system may include a GPS module and/or a plurality of electronic speed controllers each operably associated with one of the propulsion assemblies.

In a second aspect, the present disclosure is directed to an unmanned aircraft system having a compact storage configuration and a flight configuration in which the system is operable for thrust-borne lift in a VTOL orientation and wing-borne lift in a flying wing orientation. The unmanned aircraft system includes an airframe having a first edge, a second edge, a root chord, a first wingtip and a second wingtip. The airframe has an airfoil cross-section along chord stations thereof. A thrust array is coupled to the airframe. The thrust array including a first motor mount rotatably coupled to the leading edge between the root chord and the first wingtip and a second motor mount rotatably coupled to the first edge between the root chord and the second wingtip. Each of the motor mounts has first and second propulsion assemblies coupled to respective first and second distal ends thereof. An electric power system is operably associated with the thrust array and is operable to provide power to each of the propulsion assemblies. A flight control system is operably associated with the thrust array and is operable to independently control the speed of each of the propulsion assemblies. In the flight configuration, each of the motor mounts is substantially perpendicular with the first edge such that the thrust array forms a two-dimensional distributed thrust array. In the compact storage configuration, each of the motor mounts is substantially parallel with the first edge.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4I are schematic illustrations of a flying wing aircraft in a sequential flight operating scenario in accordance with embodiments of the present disclosure;

FIGS. 7A-7F are schematic illustrations of a motor mound twist lock for a flying wing aircraft in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
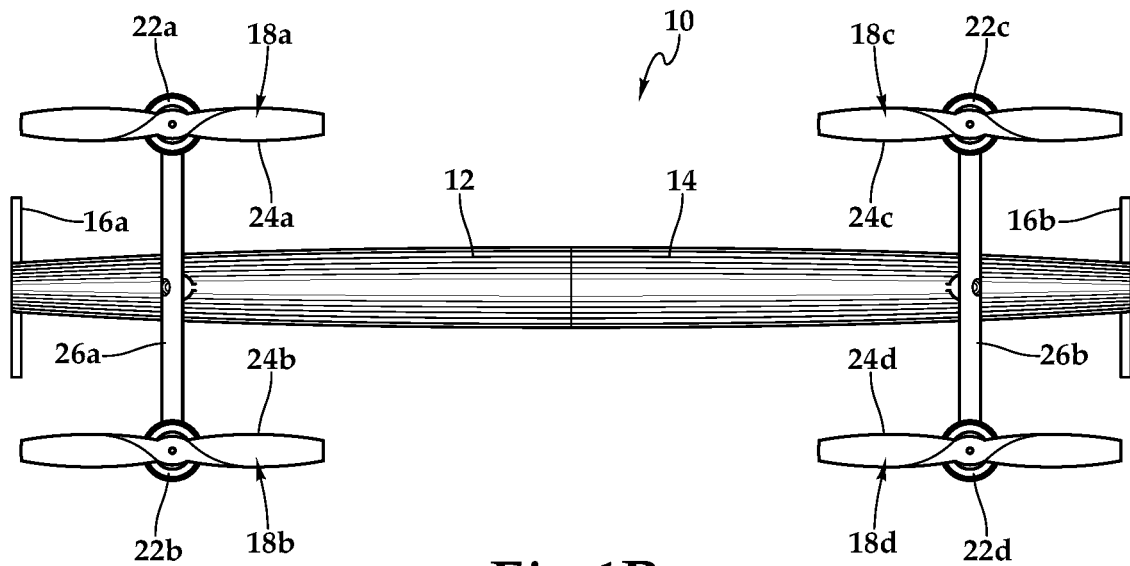
FIGS. 1A-1F are schematic illustrations of a flying wing aircraft in accordance with embodiments of the present disclosure.
Figure 1A:
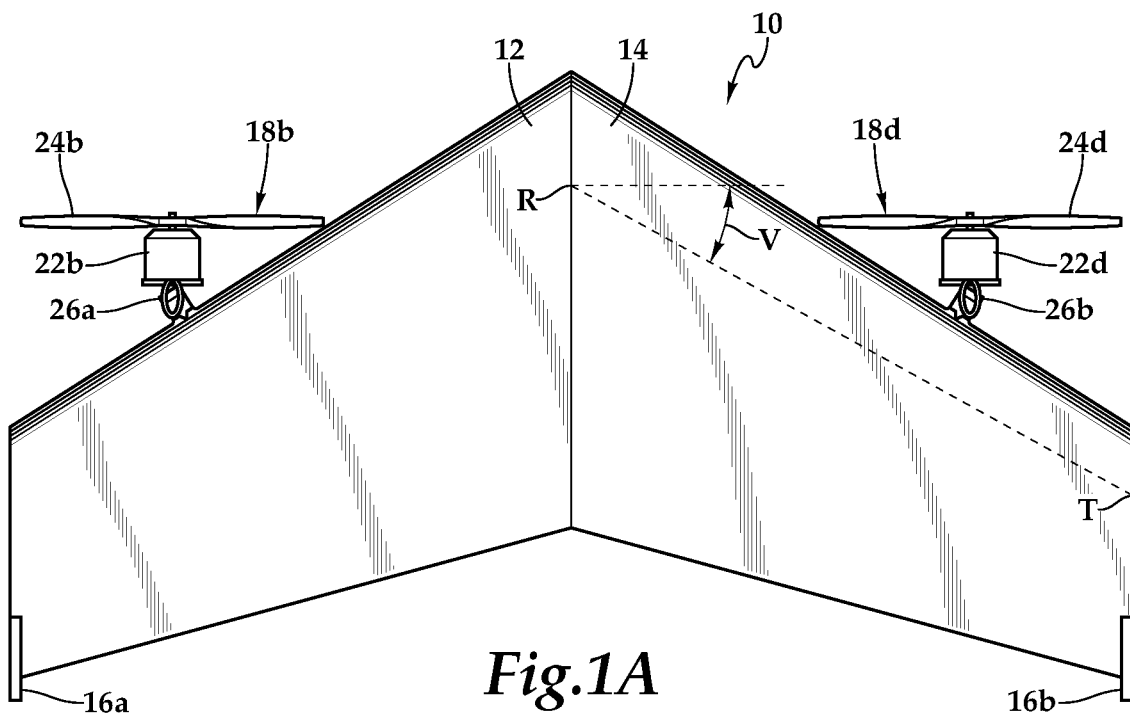
Figure 1D:
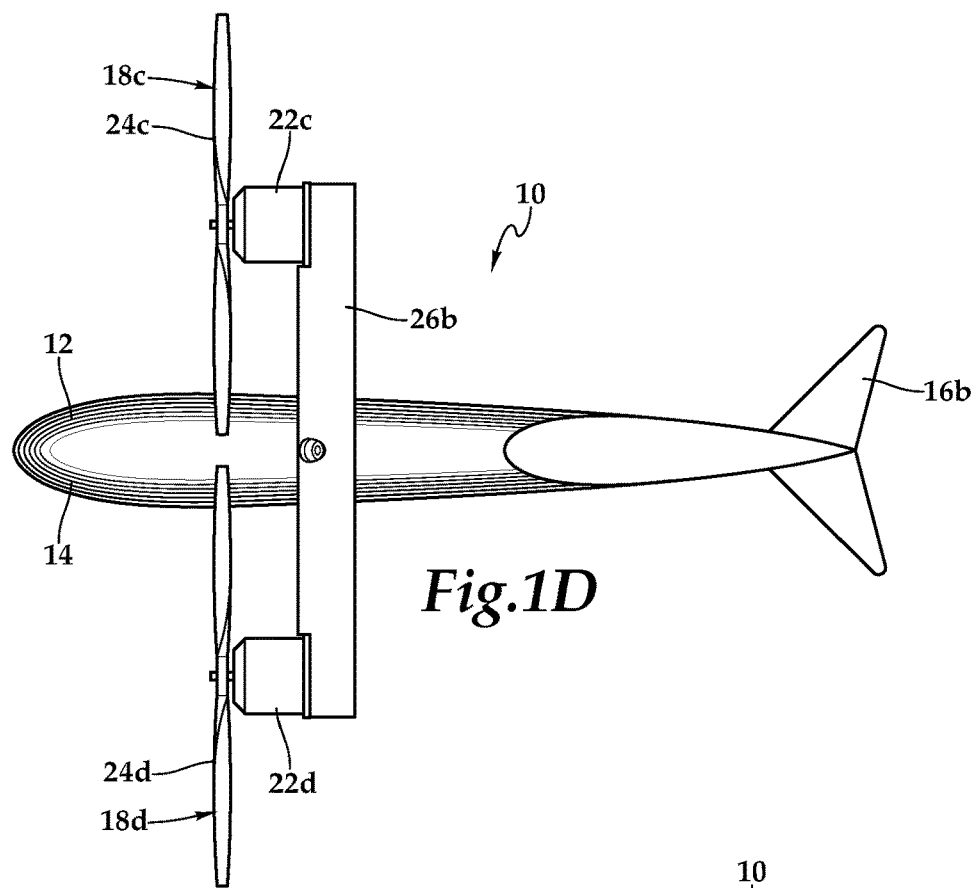
Figure 1C:
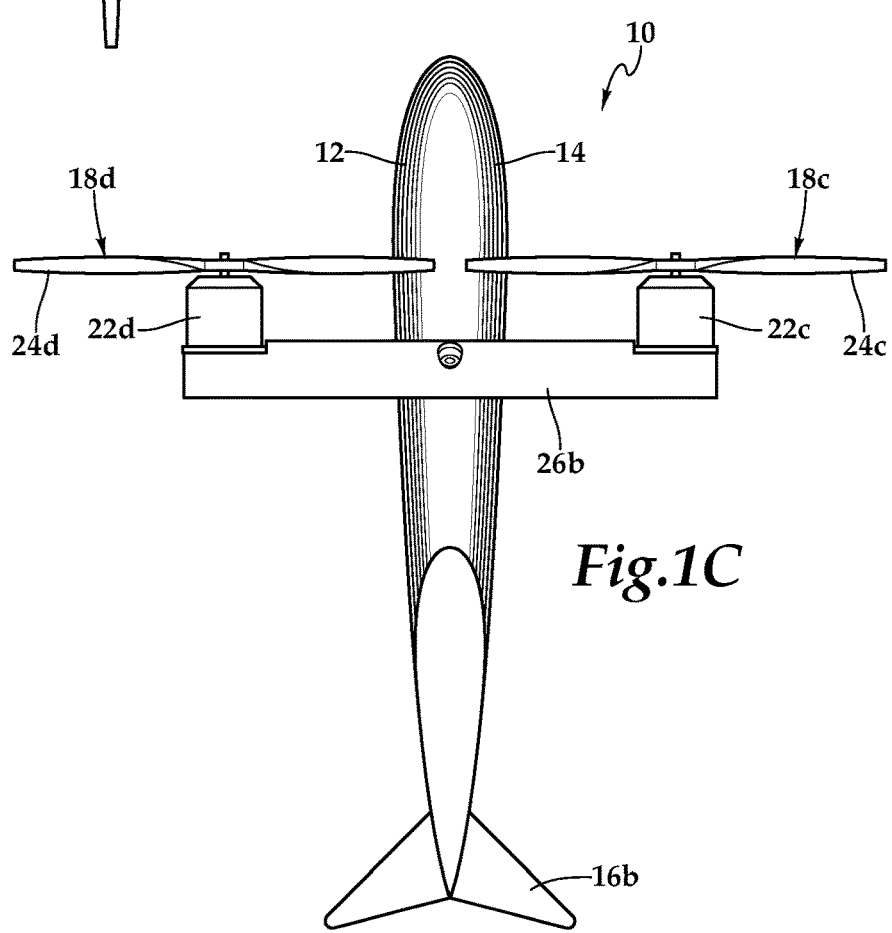
Figure 1F:
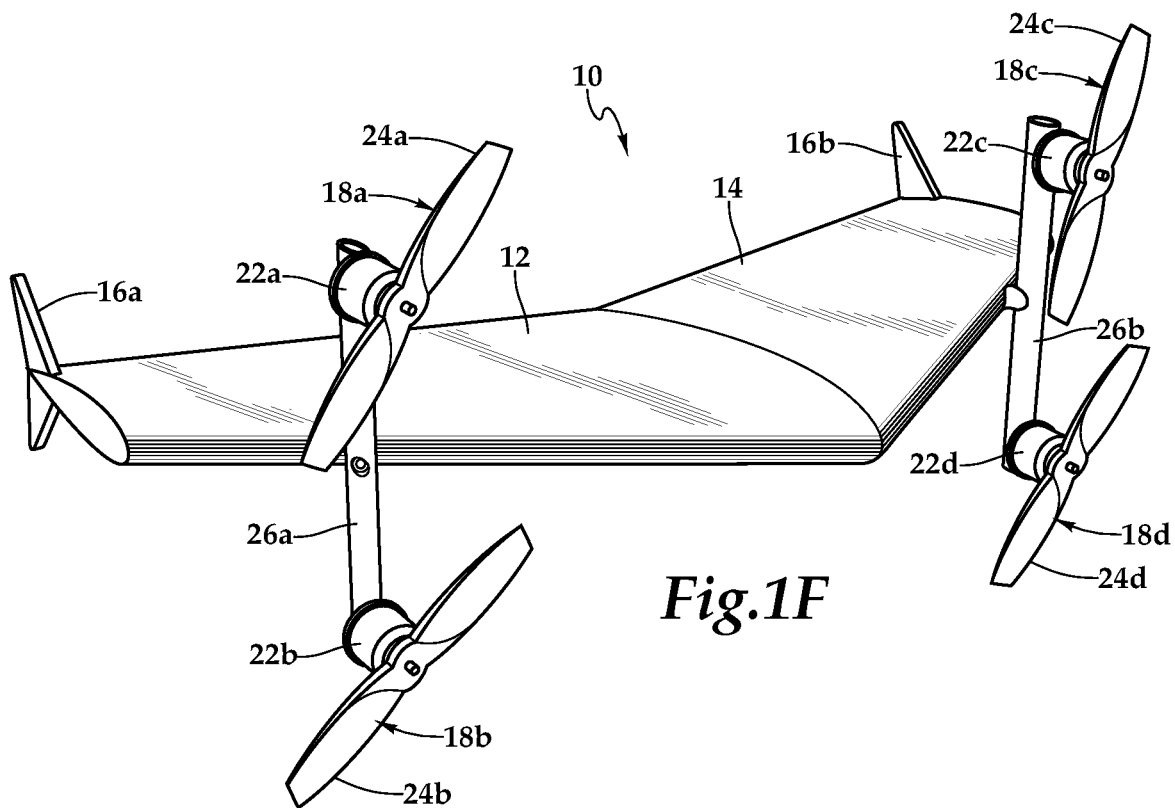
Figure 1E:
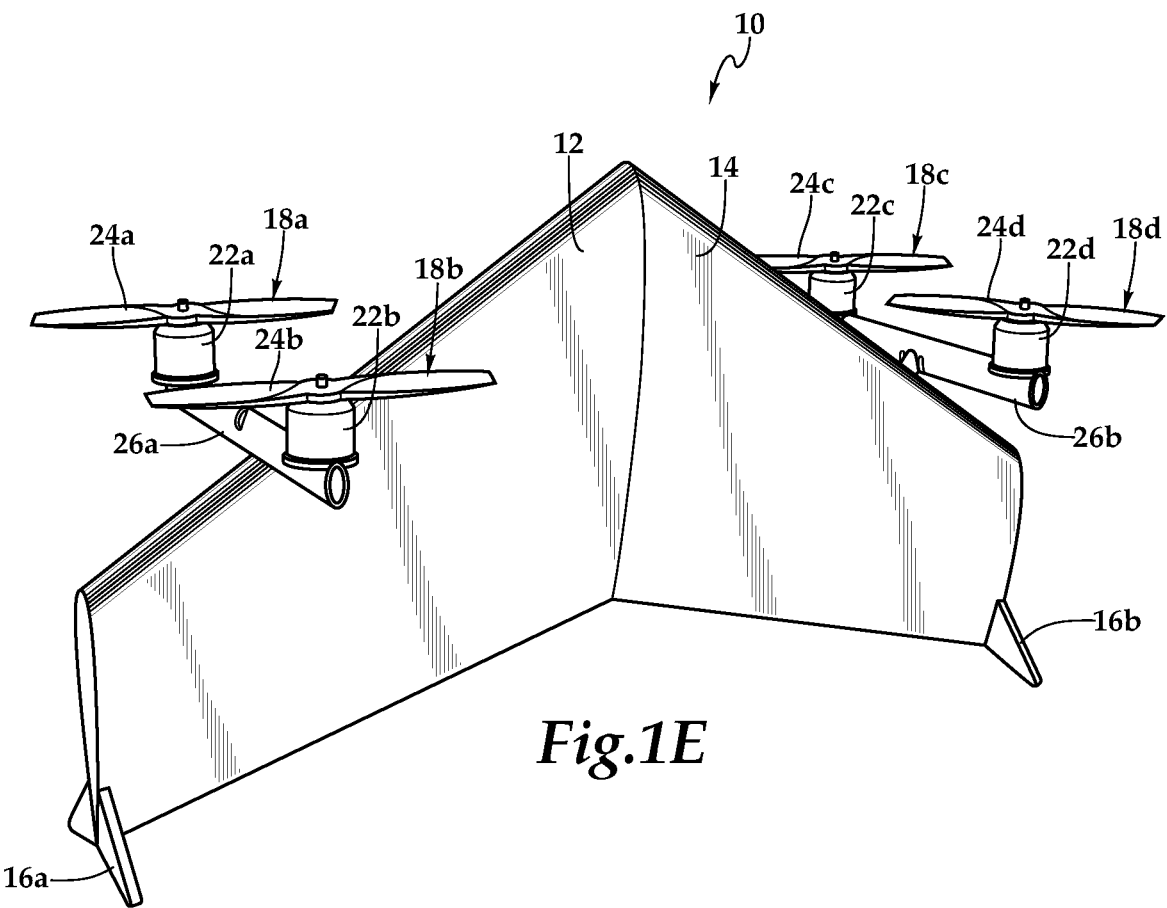

Referring to FIGS. 1A-1F in the drawings, various views of an unmanned aircraft system operable to transition between a flight configuration having a two-dimensional distributed thrust array and a compact storage configuration are depicted. The unmanned aircraft system is referred to herein as aircraft 10. FIGS. 1A, 1C, 1E depict aircraft 10 in a thrust-borne lift flight mode which may also be referred to as the vertical takeoff and landing or VTOL orientation of aircraft 10. FIGS. 1B, 1D, 1F depict aircraft 10 in wing-borne lift flight mode which may also be referred to as the forward flight or flying wing orientation of aircraft 10. In the illustrated embodiment, aircraft 10 has an airframe 12 depicted as a flying wing 14 that has an airfoil cross-section along the chord stations thereof that generates lift responsive to the forward airspeed of aircraft 10 in the flying wing orientation of aircraft 10. Flying wing 14 has a swept wing design and may have a quarter chord sweep angle between about 20 degrees and about 40 degrees such as a quarter chord sweep angle between about 25 degrees and about 35 degrees or a quarter chord sweep angle of about 30 degrees.

In the illustrated embodiment, the quarter chord sweep angle V is about 30 degrees and more specifically 28 degrees as measured from the quarter root chord R to quarter wingtip chord T of flying wing 14. It is noted that in the illustrated embodiment, the leading edge sweep angle is greater than the quarter chord sweep angle and is about 30 degrees and more specifically 32 degrees, the half chord sweep angle is less than the quarter chord sweep angle and is about 23 degrees and the trailing edge sweep angle is less than the half chord sweep angle and is about 15 degrees. In the illustrated embodiment, the sweep angle progressively decreases from the leading edge to the trailing edge forming a tapered swept wing design. In other embodiments, the sweep angle may remain constant from the leading edge to the trailing edge forming a simple swept wing design, the leading edge may have a sweep angle and the trailing edge may not have a sweep angle forming a delta swept wing design or the leading edge may have a positive sweep angle and the trailing edge may negative sweep angle forming a trapezoidal swept wing design. In additional embodiments, the flying wing could have a straight wing design or a forward swept wing design.

Preferably, airframe 12 is formed from a minimal number of components or sections such as two sections wherein at least a portion of the wing skin is integral with the wing substructure. This can be achieved by forming airframe 12 using an additive process such as by three-dimensional printing of the integral airframe section. A separate portion of the wing skin in the form of a selectively removable/attachable access panel may also be formed using an additive process such as by three-dimensional printing. The selectively removable/attachable access panel may be coupled to the integral airframe section with mechanical connections such as screws, snaps, hook and loop fasteners and/or other suitable joining technique. Removal of the access panel from the integral airframe section provides easy access to internal components of aircraft 10 that are disposed within airframe 12, as discussed herein. Airframe 12 or component parts thereof could alternatively be formed using composite lay up, injection molding, shrink wrapping, material removal or other suitable techniques. Airframe 12 is preferably formed from a lightweight, high-strength material such as plastics, metals including aluminum, composites including fiberglass and/or carbon or other suitable material or combination of materials.

Aircraft 10 includes landing gear depicted as tail member's 16a, 16b that enable aircraft 10 to operate as a tailsitting aircraft. In the illustrated embodiment, tail members 16a, 16b are fixed landing struts. In other embodiments, the tail members may be active landing struts capable of position change. Preferably, tail members 16a, 16b are formed as integral parts of airframe 12 during the additive process such as during a three-dimensional printing process. In the illustrated embodiment, tail members 16a, 16b form passive control surfaces or aerosurfaces that serve as vertical stabilizers during wing-borne flight and serve to enhance hover stability during thrust-borne flight. In other embodiments, the tail members may be active aerosurfaces that serve as horizontal stabilizers, vertical stabilizers, elevators and/or rudders during wing-borne flight.

In the flight configuration, aircraft 10 has a two-dimensional distributed thrust array including four propulsion assemblies 18a, 18b, 18c, 18d that are independently operated and controlled by the flight control system of aircraft 10, as discussed herein. It should be noted, however, that the distributed thrust array of the present disclosure could have any number of independent propulsion assemblies including six, eight, twelve, sixteen or other number of independent propulsion assemblies. As used herein, the term "two-dimensional thrust array" refers to a plurality of thrust generating elements having substantially parallel axes of rotation forming a two-dimensional array when projected to a plane perpendicular to their axes of rotation. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements.

In the illustrated embodiment, propulsion assembly 18a includes an electric motor 22a and a rotor assembly 24a, propulsion assembly 18b includes an electric motor 22b and a rotor assembly 24b, propulsion assembly 18c includes an electric motor 22c and a rotor assembly 24c and propulsion assembly 18d includes an electric motor 22d and a rotor assembly 24d. Each rotor assembly 24a, 24b, 24c, 24d is coupled to an output drive of a respective electrical motor 22a, 22b, 22c, 22d that rotates the rotor assembly 24a, 24b, 24c, 24d in a rotational plane to generate thrust for aircraft 10. In the illustrated embodiment, rotor assemblies 24a, 24b, 24c, 24d each include two rotor blades having a fixed pitch. In other embodiments, the rotor assemblies could have other numbers of rotor blades greater than two. Alternatively or additionally, the rotor assemblies could have variable pitch rotor blades.

Propulsion assemblies 18a, 18b are coupled to distal ends of a motor mount 26a and propulsion assemblies 18c, 18d are coupled to distal ends of a motor mount 26b. In the illustrated embodiment, motor mounts 26a, 26b are rotatably coupled to the leading edge of airframe 12 to enable aircraft 10 to transition between the flight configuration and the compact storage configuration, as discussed herein. In other embodiment, motor mounts 26a, 26b could be rotatably coupled to the trailing edge of airframe 12. In the flight configuration, the four independently operating propulsion assemblies 18a, 18b, 18c, 18d form a two-dimensional distributed thrust array with each of the propulsion assemblies having a symmetrically disposed propulsion assembly. In the illustrated configuration, propulsion assemblies 18a, 18d are symmetrically disposed propulsion assemblies and propulsion assemblies 18b, 18c are symmetrically disposed propulsion assemblies.

Figure 2A:
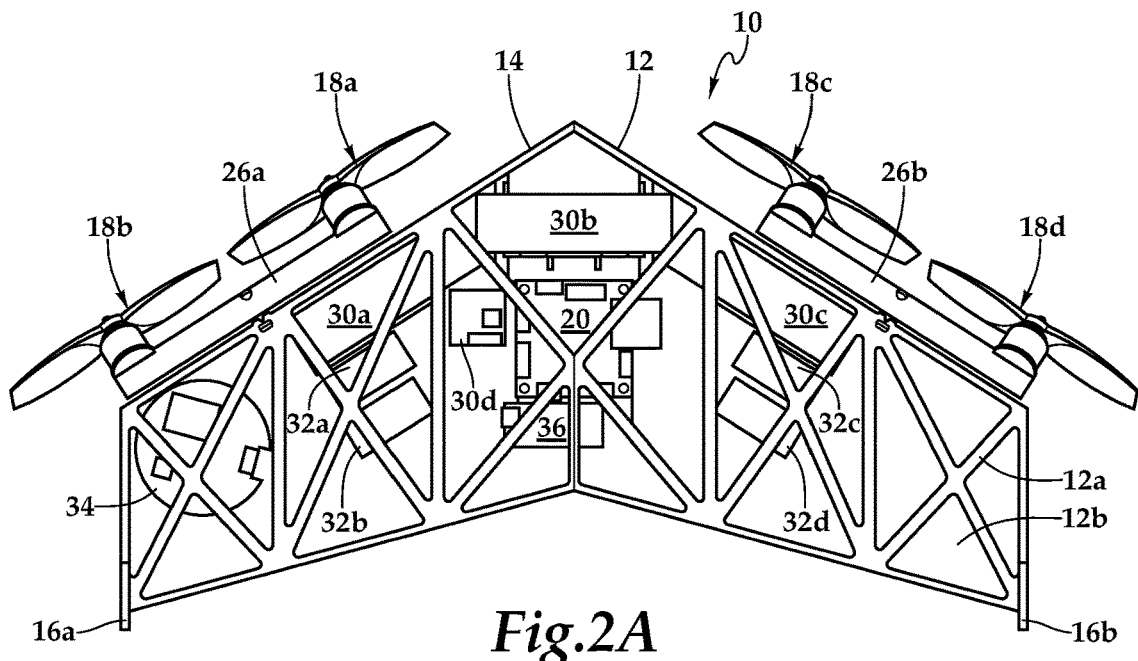
FIGS. 2A-2B are systems diagrams of a flying wing aircraft in accordance with embodiments of the present disclosure.
Figure 2B:
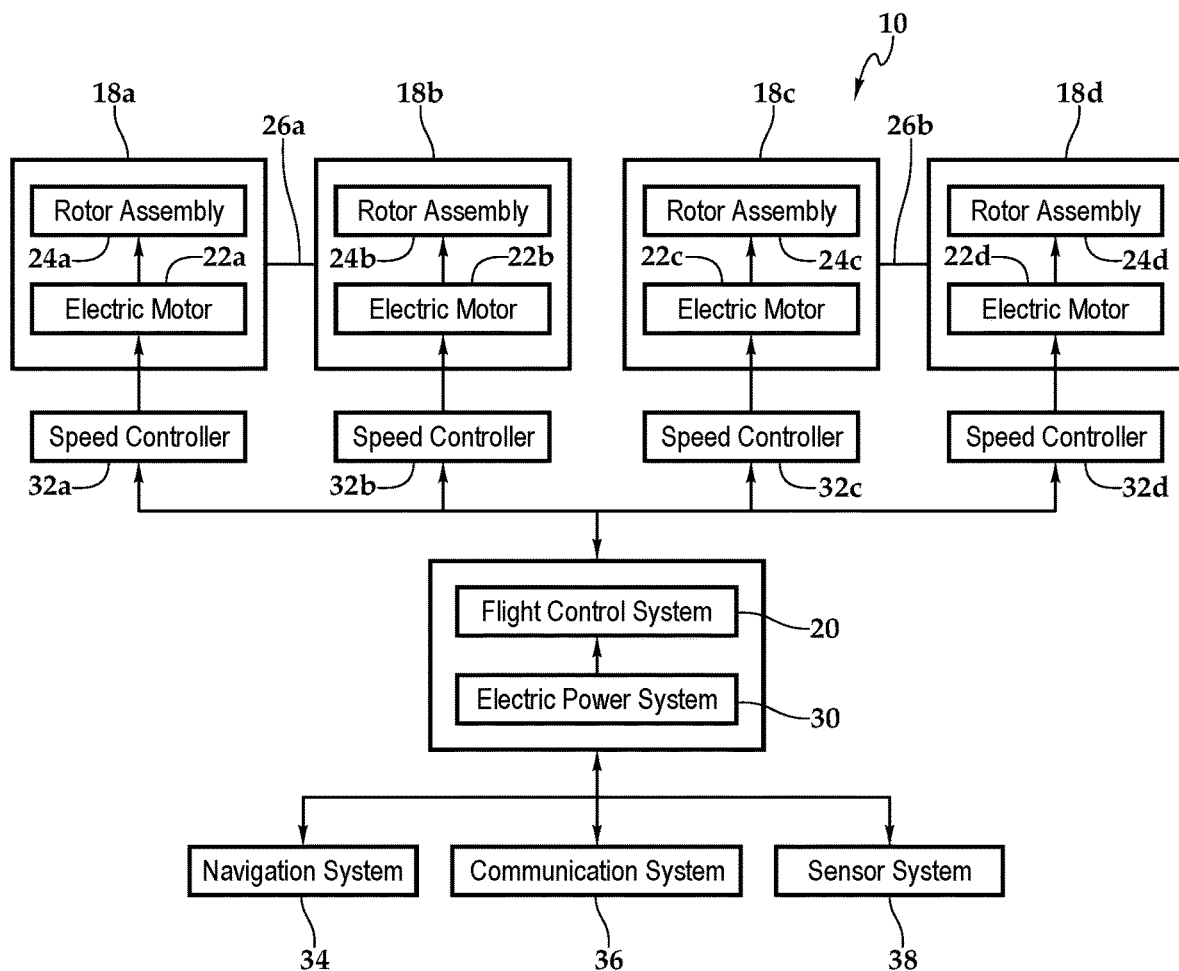

Referring additionally to FIGS. 2A-2B, the various systems of aircraft 10 will now be discussed. It is noted that the front skin has been removed from airframe 12 revealing the wing substructure 12a, the interior of the rear skin 12b as well as the various systems of aircraft 10. In the illustrated embodiment, aircraft 10 has a flight control system 20 that is housed within airframe 12. Flight control system 20, such as a digital flight control computer, preferably includes non-transitory computer readable storage media including a set of computer instructions executable by one or more processors for controlling the operation of aircraft 10. Flight control system 20 may be implemented on one or more general-purpose computers, special purpose computers or other machines with memory and processing capability. For example, flight control system 20 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 20 may be a microprocessor-based system operable to execute program code in the form of machine-executable instructions. In addition, flight control system 20 may be selectively connectable to other computer systems via a suitable communication network that may include both wired and wireless connections.

Flight control system 20 is operably associated with an electric power system 30 depicted as batteries 30a, 30b, 30c and power controller 30d. Preferably, batteries 30a, 30b, 30c are rechargeable batteries and/or easily replaceable batteries that provide aircraft 10 with thirty to sixty minutes or more of flight time at tens or hundreds of feet in the air. Electric power system 30 provides electrical energy to the various systems of aircraft 10 including propulsion assemblies 18a, 18b, 18c, 18d, flight control system 20, electronic speed controllers 32a, 32b, 32c, 32d, a navigation system 34 such as a GPS module, a communication system 36 and a sensor system 38. Flight control system 20 of aircraft 10 may be operated responsive to autonomous flight control, remote flight control or a combination thereof. For example, flight control system 20 may use waypoint navigation to follow a trail of preprogramed waypoints to accomplish a desired mission. Alternatively or additionally, flight control system 20 may be operated responsive to assisted manual flight based upon commands received from a ground station via communication system 36 using a wireless communications protocol. During assisted manual flight, aircraft 10 may be limited to flight within a line of sight communications range.

In the illustrated embodiment, sensor system 38 is controlled by flight control system 20. In other embodiments, sensor system 38 may utilize an independent control system. Sensor system 38 may include a sensor array having one or more of an optical camera, a thermal camera, an infrared camera, a video camera, an intelligence, surveillance and reconnaissance module and/or other desired sensors. For example, sensor system 38 may include a forward pointing camera and/or a downward pointing camera when aircraft 10 is in the flying wing orientation. Sensor system 38 may provide real time images and/or video to the ground station via communication system 36 using a wireless communications protocol, which may be useful when aircraft 10 is operated as a soldier borne sensor. Alternatively or additionally, sensor system 38 may capture and store information during a mission for download after the mission.

In the illustrated embodiment, flight control system 20 communicates via a wired communications network with the various systems of aircraft 10. In other embodiments, flight control system 20 could communicate with the various systems of aircraft 10 via a wireless communications network. During flight operations, flight control system 20 sends commands to electronic speed controllers 32a, 32b, 32c, 32d such that each propulsion assembly 18a, 18b, 18c, 18d may be individually and independently controlled and operated. In this manner, flight control system 20 is operable to individually and independently control the operating speed of each propulsion assembly 18a, 18b, 18c, 18d. Flight control system 20 may autonomously control some or all aspects of flight operation for aircraft 10. Flight control system 20 is also operable to communicate with remote systems, such as a ground station via a wireless communications protocol. The remote system may be operable to receive flight data from and provide commands to flight control system 20 to enable remote flight control over some or all aspects of flight operation for aircraft 10. The autonomous and/or remote operation of aircraft 10 enables aircraft 10 to perform unmanned logistic operations for both military and commercial applications.

Figure 3:
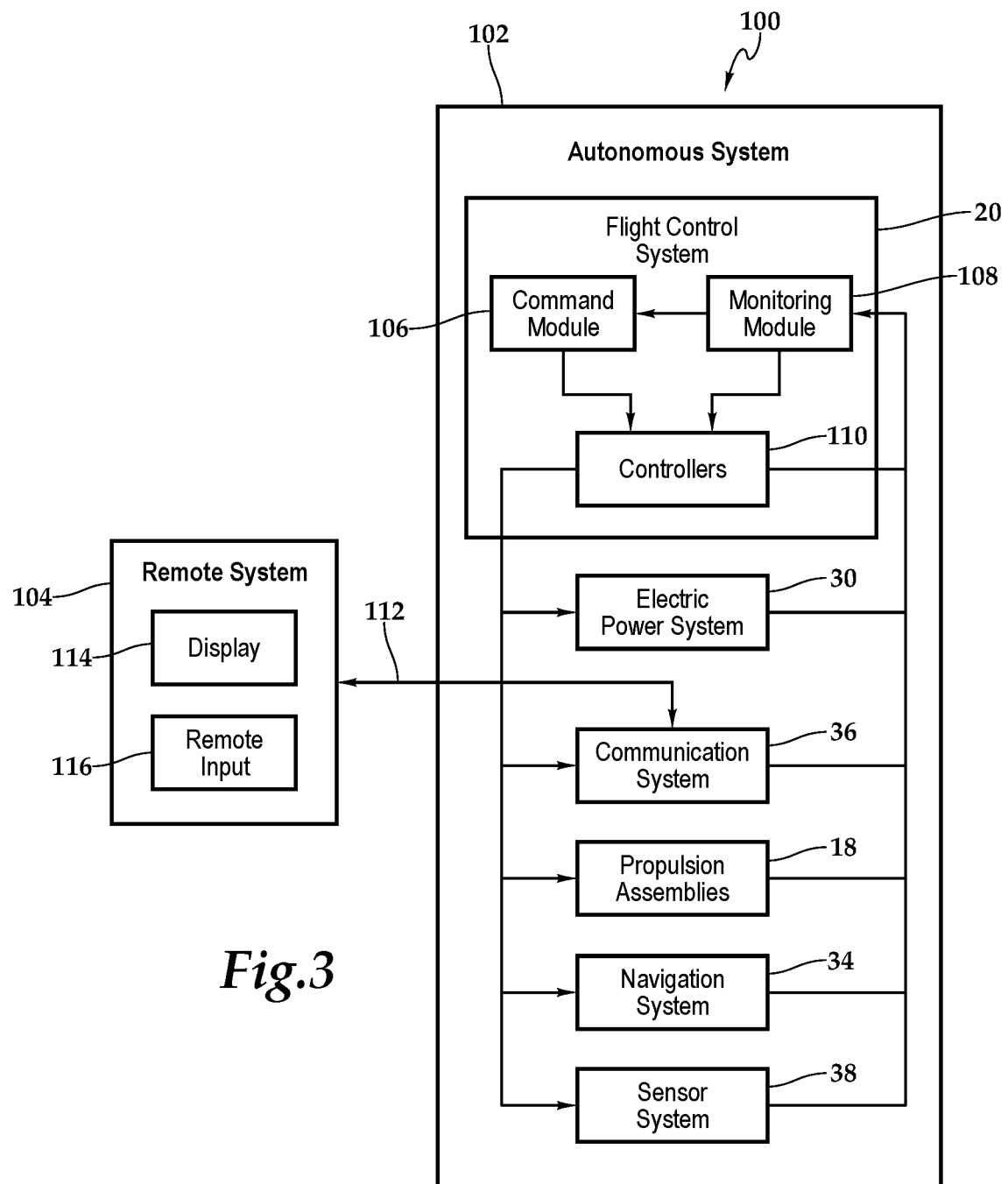
FIG. 3 is a block diagram of control systems for a flying wing aircraft in accordance with embodiments of the present disclosure.

Referring additionally to FIG. 3 in the drawings, a block diagram depicts an aircraft control system 100 operable for use with aircraft 10 of the present disclosure. In the illustrated embodiment, system 100 includes two primary computer based subsystems; namely, an autonomous system 102 and a remote system 104. As discussed herein, the aircraft of the present disclosure may be operated autonomously responsive to commands generated by flight control system 20. In the illustrated embodiment, flight control system 20 includes a command module 106, a monitoring module 108 and controllers 110 such as power controller 30d and electronic speed controllers 32a, 32b, 32c, 32d discussed herein. It is to be understood by those skilled in the art that these and other modules executed by flight control system 20 may be implemented in a variety of forms including hardware, software, firmware, special purpose processors and combinations thereof.

During the various flight operating modes of aircraft 10, monitoring module 108 may receive feedback from the propulsion assemblies collectively denoted as 18, controllers 110, electric power system 30, navigation system 34, communication system 36 and/or sensor system 38. This feedback is processed by monitoring module 108 to supply correction data and other information to command module 106 and/or controllers 110. Sensor system 38 may include altitude sensors, attitude sensors, speed sensors, environmental sensors, fuel supply sensors, temperature sensors and the like that provide additional information to monitoring module 108 to further enhance autonomous control capabilities.

Some or all of the autonomous control capability of flight control system 20 can be augmented or supplanted by remote flight control system 104. Remote system 104 may include one or more computing systems that may be implemented on general-purpose computers, special purpose computers or other machines with memory and processing capability including, for example, a tablet computer. The computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 104 communicates with flight control system 20 via communication system 36 over a communication link 112 that may include both wired and wireless connections.

Remote system 104 preferably includes one or more display devices 114 configured to display information relating to or obtained by one or more aircraft of the present disclosure. Remote system 104 may also include audio output and input devices such as a microphone, speakers and/or an audio port allowing an operator to communicate with, for example, other remote station operators. Display device 114 may also serve as a remote input device 116 if a touch screen display implementation is used, however, other remote input devices, such as a keyboard or joysticks, may alternatively be used to allow an operator to provide control commands to aircraft 10.

Referring additionally to FIGS. 4A-4I in the drawings, a sequential flight-operating scenario of aircraft 10 is depicted. As best seen in FIG. 4A, aircraft 10 is in a tailsitting position on a surface. When aircraft 10 is ready for a mission, flight control system 20 commences operations to provide flight control to aircraft 10 which may be autonomous flight control, remote flight control or a combination thereof. For example, it may be desirable to utilize remote flight control during certain maneuvers such as takeoff and landing but rely on autonomous flight control during hover, high speed forward flight and/or transitions between wing-borne lift and thrust-borne lift.

As best seen in FIG. 4B, aircraft 10 has performed a vertical takeoff and is engaged in thrust-borne lift in the VTOL orientation of aircraft 10. As illustrated, the rotor assemblies 24a, 24b, 24c, 24d are each rotating in substantially the same horizontal plane forming of a two-dimensional distributed thrust array. As noted, flight control system 20 independently controls and operates each propulsion assembly 18a, 18b, 18c, 18d including independently controlling operating speeds. During hover, flight control system 20 may utilize speed control and/or differential speed control of rotor assemblies 24a, 24b, 24c, 24d for stabilizing aircraft 10, for altitude control, for position control and for providing pitch, roll and yaw authority. For example, altitude control may be achieved by collectively changing the speed of all rotor assemblies 24a, 24b, 24c, 24d. If aircraft 10 is in a stable hover with rotor assemblies 24a, 24b, 24c, 24d each rotating in substantially the same horizontal plane, collectively increasing the speed of all rotor assemblies 24a, 24b, 24c, 24d causes aircraft 10 to ascend vertically. If aircraft 10 is in a stable hover with rotor assemblies 24a, 24b, 24c, 24d each rotating in substantially the same horizontal plane, collectively decreasing the speed of all rotor assemblies 24a, 24b, 24c, 24d causes aircraft 10 to descend vertically. Yaw control may be achieved by differentially changing the speed of the rotor assemblies rotating clockwise, such as rotor assemblies 24a, 24d relative to the rotor assemblies rotating counterclockwise, such as rotor assemblies 24b, 24c. Roll control may be achieved by differentially changing the speed of rotor assemblies 24a, 24b relative to rotor assemblies 24c, 24d. Pitch control may be achieved by differentially changing the speed of rotor assemblies 24a, 24c relative to rotor assemblies 24b, 24d.

Adjusting the attitude of aircraft 10 through roll and pitch control enables lateral movement of aircraft 10. For example, to move forward, if aircraft 10 is in a stable hover with rotor assemblies 24a, 24b, 24c, 24d each rotating in substantially the same horizontal plane, differential speed control is used to pitch aircraft 10 forward, which creates a lateral component in the thrust vectors generated by rotor assemblies 24a, 24b, 24c, 24d that urges aircraft 10 in the forward direction. To move aft, if aircraft 10 is in a stable hover with rotor assemblies 24a, 24b, 24c, 24d each rotating in substantially the same horizontal plane, differential speed control is used to pitch aircraft 10 aft, which creates a lateral component in the thrust vectors generated by rotor assemblies 24a, 24b, 24c, 24d that urges aircraft 10 in the aft direction. Thus, by changing the pitch attitude of aircraft 10, fore-aft lateral movement is achieved. To move in the starboard direction, if aircraft 10 is in a stable hover with rotor assemblies 24a, 24b, 24c, 24d each rotating in substantially the same horizontal plane, differential speed control is used to roll aircraft 10 starboard, which creates a lateral component in the thrust vectors generated by rotor assemblies 24a, 24b, 24c, 24d that urges aircraft 10 in the starboard direction. To move in the port direction, if aircraft 10 is in a stable hover with rotor assemblies 24a, 24b, 24c, 24d each rotating in substantially the same horizontal plane, differential speed control is used to roll aircraft 10 port, which creates a lateral component in the thrust vectors generated by rotor assemblies 24a, 24b, 24c, 24d that urges aircraft 10 in the port direction. Thus, by changing the roll attitude of aircraft 10, port-starboard lateral movement is achieved.

After vertical ascent to the desired elevation, aircraft 10 may begin the transition from the VTOL orientation to the flying wing orientation. As best seen from the progression of FIGS. 4B-4E, aircraft 10 is operable to pitch forward transitioning from thrust-borne lift to wing-borne lift to enable high speed and/or long range forward flight. Flight control system 20 may achieve this pitch forward operation using differential speed control by increasing the speed of rotor assemblies 24a, 24c and/or decreasing the speed of rotor assemblies 24b, 24d, as discussed herein.

As best seen in FIG. 4E during level flight in the flying wing orientation of aircraft 10, rotor assemblies 24a, 24b, 24c, 24d are each rotating in substantially the same vertical plane forming of a two-dimensional distributed thrust array. As wing-borne forward flight requires significantly less power than thrust-borne vertical flight, the operating speed of propulsion assembly 24a, 24b, 24c, 24d may be reduced to increase the endurance of aircraft 10. In forward flight mode, the independent control of flight control system 20 over each propulsion assembly 24a, 24b, 24c, 24d provides airspeed control as well as direction control via pitch, roll and yaw authority using differential speed control. For example, airspeed control may be achieved by collectively changing the speed of all rotor assemblies 24a, 24b, 24c, 24d, collectively increasing rotor speed to increase airspeed and collectively decreasing rotor speed to decrease airspeed. Pitch control is achieved by differentially changing the speed of rotor assemblies 24a, 24c relative to rotor assemblies 24b, 24d. Roll control is achieved by differentially changing the speed of the rotor assemblies rotating clockwise, such as rotor assemblies 24a, 24d relative to the rotor assemblies rotating counterclockwise, such as rotor assemblies 24b, 24c. Yaw control is achieved by differentially changing the speed of rotor assemblies 24a, 24b relative to rotor assemblies 24c, 24d. In the illustrated embodiment, pitch, roll and yaw control and change in direction are achieved during forward flight without the need for conventional control surfaces.

As aircraft 10 approaches its destination, aircraft 10 may begin its transition from wing-borne lift to thrust-borne lift. As best seen from the progression of FIGS. 4E-4H, aircraft 10 is operable to pitch aft from the flying wing orientation to the VTOL orientation to enable, for example, a vertical landing operation. Flight control system 20 may achieve this pitch aft operation using differential speed control by decreasing the speed of rotor assemblies 24a, 24c and/or increasing the speed of rotor assemblies 24b, 24d, as discussed herein. Once aircraft 10 has completed the transition to the VTOL orientation, aircraft 10 may commence its vertical descent to a surface. As best seen in FIG. 4I, aircraft 10 has landed in a tailsitting orientation at the destination location.

Figure 5C:
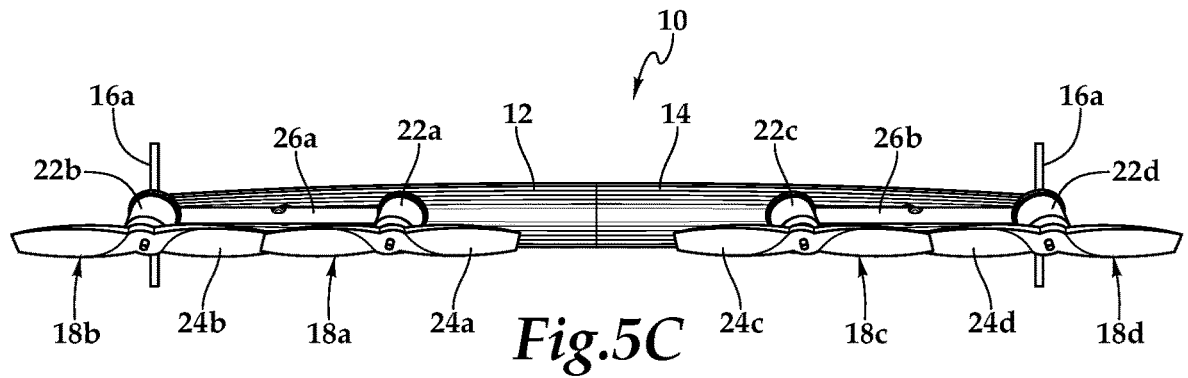
FIGS. 5A-5E are schematic illustrations of a flying wing aircraft in accordance with embodiments of the present disclosure transitioning between a flight configuration having a two-dimensional distributed thrust array and a compact storage configuration.
Figure 5B:
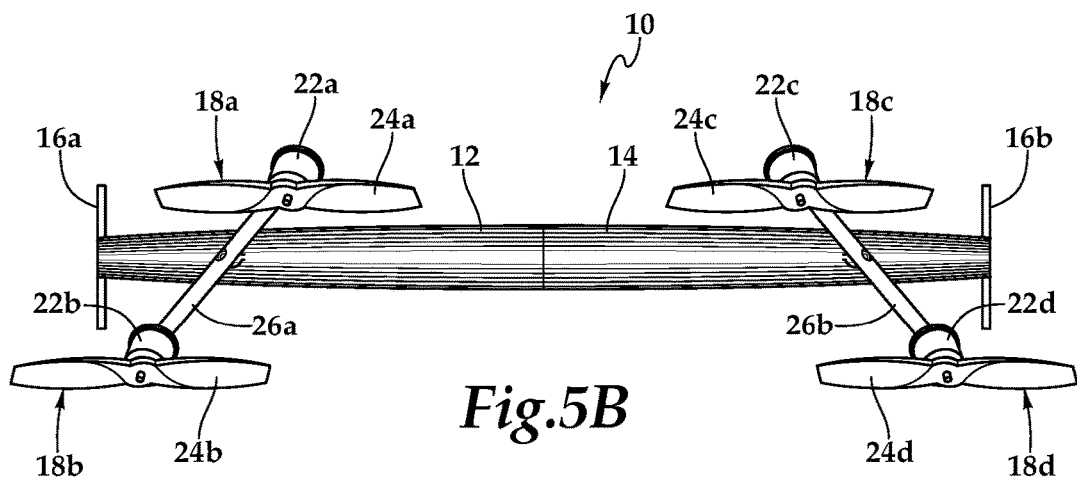
Figure 5A:
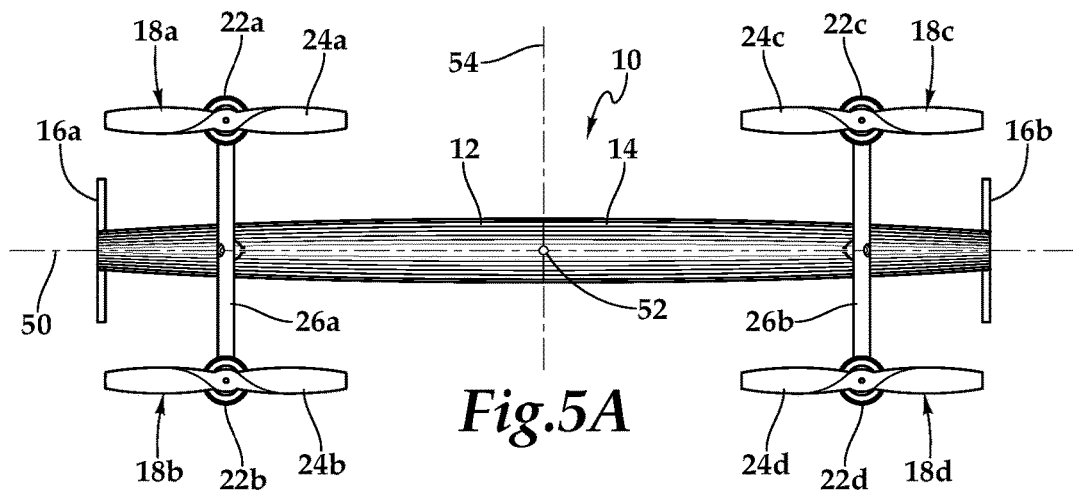

Referring next to FIGS. 5A-5E, the transition between the flight configuration and the compact storage configuration of aircraft 10 will now be described. In FIG. 5A, aircraft 10 is depicted in flight configuration, as discussed herein, with motor mounts 26a, 26b extending substantially perpendicular to the pitch axis 50, substantially perpendicular to the roll axis 52 and substantially parallel with the yaw axis 54 of aircraft 10. In this position, motor mounts 26a, 26b are substantially perpendicular to the leading edge of airframe 12 such that propulsion assemblies 18a, 18b, 18c, 18d form a two-dimensional distributed thrust array wherein the thrust vector generated by each of propulsion assemblies 18a, 18b, 18c, 18d is substantially parallel with roll axis 52, substantially perpendicular with pitch axis 50 and substantially perpendicular with the yaw axis 54, such that the thrust vectors are substantially in the chord direction of flying wing 14 during both thrust-borne lift in the VTOL orientation of aircraft 10 and wing-borne lift in the flying wing orientation of aircraft 10. Accordingly, during a stable hover in the VTOL orientation of aircraft 10, rotor assemblies 24a, 24b, 24c, 24d each rotate in substantially the same horizontal plane and, during level flight in the flying wing orientation of aircraft 10, rotor assemblies 24a, 24b, 24c, 24d each rotate in substantially the same vertical plane.

In the flight configuration, however, aircraft 10 would be difficult for a soldier to transport in a backpack, cargo pocket or other carrying case as the width of aircraft 10 is relatively large due to the cantilevered positioning of propulsion assemblies 18a, 18b, 18c, 18d. In addition, cantilevered positioning of propulsion assemblies 18a, 18b, 18c, 18d could put undue stress on motor mounts 26a, 26b and/or the motor mount joints with airframe 12 during storage and/or transport by a soldier. Motor mounts 26a, 26b of aircraft 10, however, are rotatably coupled to the leading edge of airframe 12 to enable aircraft 10 to transition between the flight configuration and a compact storage configuration, as best seen in the progression between FIGS. 5A-5C. In particular, FIG. 5B may represent aircraft 10 during the transition from the flight configuration to the compact storage configuration wherein motor mounts 26a, 26b have each been rotated approximately forty-five degrees relative to the leading edge of airframe 12. FIG. 5C depicts aircraft 10 in the compact storage configuration wherein motor mounts 26a, 26b have each been rotated an additional approximately forty-five degrees relative to the leading edge of airframe 12. FIG. 5B may also represent aircraft 10 during the transition from the compact storage configuration to the flight configuration wherein motor mounts 26a, 26b have each been rotated approximately forty-five degrees relative to the leading edge of airframe 12. In the illustrated embodiment, the rotation of motor mounts 26a, 26b relative to the leading edge of airframe 12 is a manual process. In other embodiments, the rotation of motor mounts 26a, 26b relative to the leading edge of airframe 12 could be an automated process using one or more actuators.

Figure 5E:
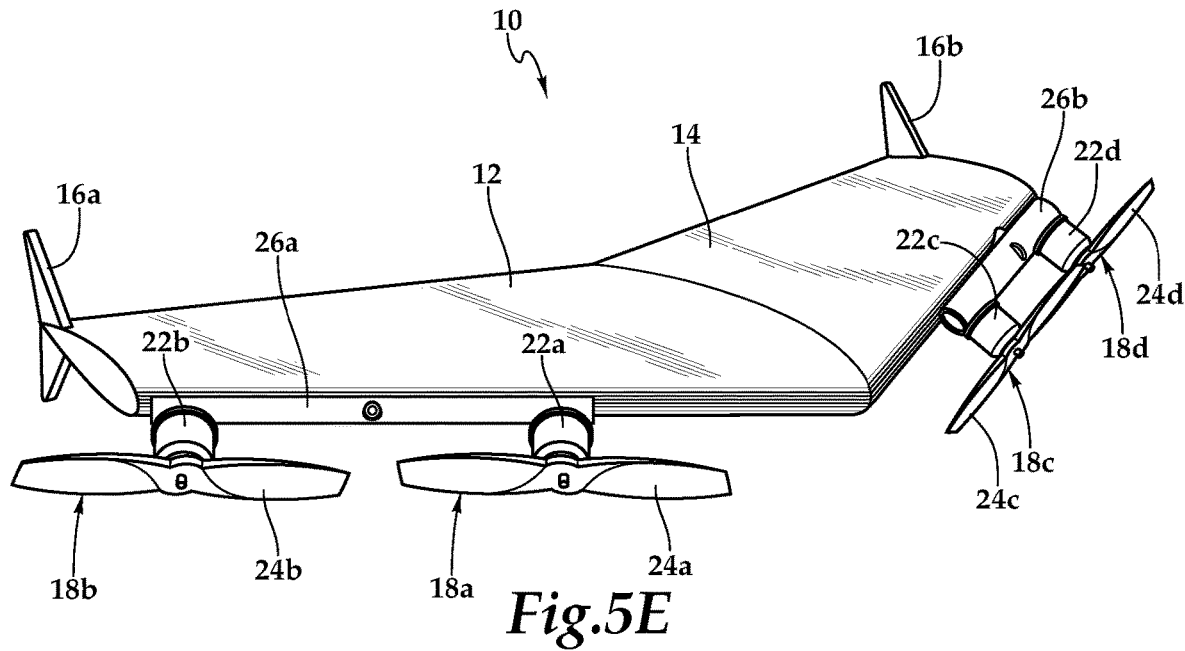
Figure 5D:
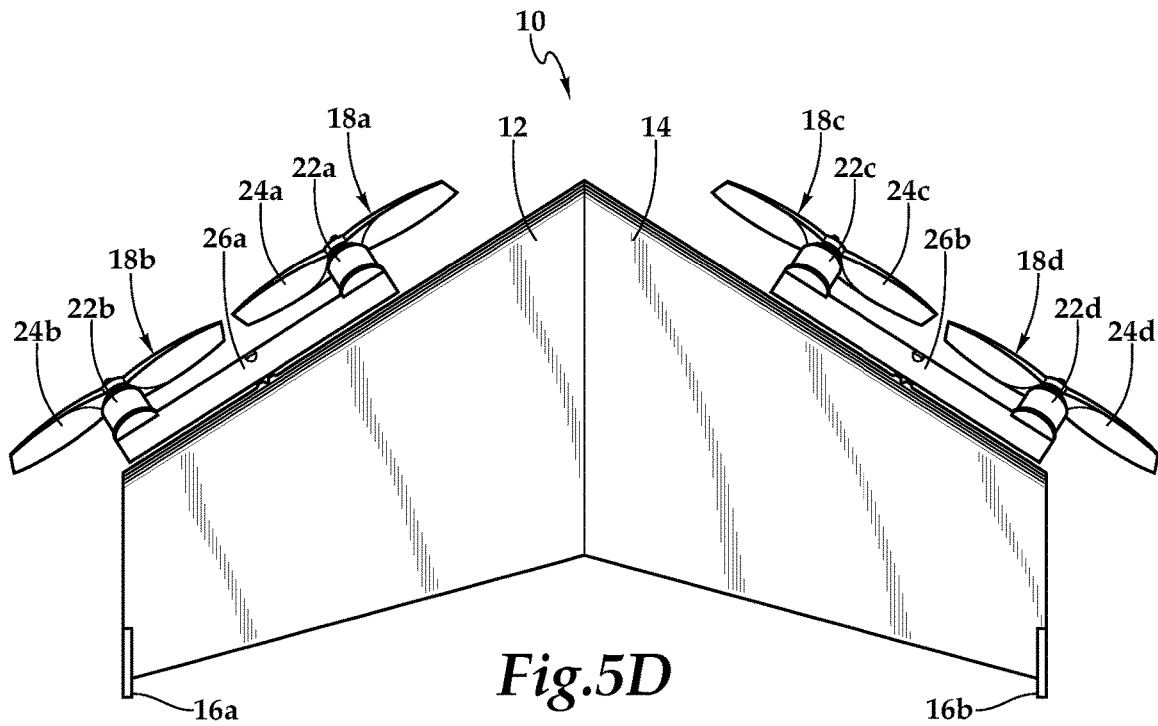

In the compact storage configuration, motor mounts 26a, 26b extend substantially parallel with the leading edge of flying wing 14. Relative to the chord direction of flying wing 14, motor mounts 26a, 26b form an angle between about 20 degrees and about 40 degrees such as an angle between about 25 degrees and about 35 degrees or an angle of about 30 degrees. In the illustrated embodiment, motor mounts 26a, 26b form an angle relative to the chord direction of flying wing 14 of about 30 degrees and more specifically 32 degrees, which is substantially congruent with the leading edge sweep angle, as best seen in FIGS. 5D-5E. In the illustrated embodiment, the outboard electrical motors 22b, 22d are positioned inboard of the wing tips of flying wing 14, in the compact storage configuration. This is preferred to prevent undue stress on the motor mount joints during storage and transport. In other embodiments, the outboard rotor tips may be positioned inboard of the wing tips of flying wing 14, in the compact storage configuration. In additional embodiments, all or a portion of the outboard electrical motors 22b, 22d may be positioned outboard of the wing tips of flying wing 14, in the compact storage configuration.

Figure 6B:
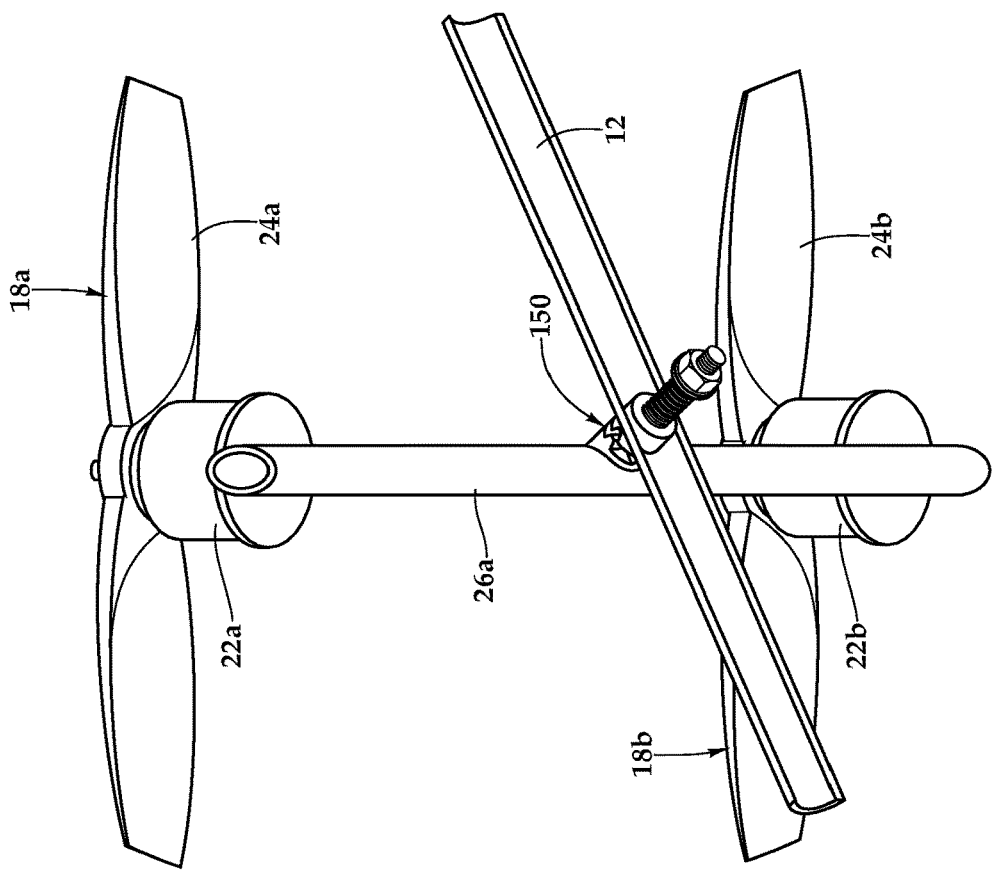
FIGS. 6A-6E are schematic illustrations of a motor mound and an airframe of a flying wing aircraft in accordance with embodiments of the present disclosure transitioning between a flight configuration and a compact storage configuration.
Figure 6A:
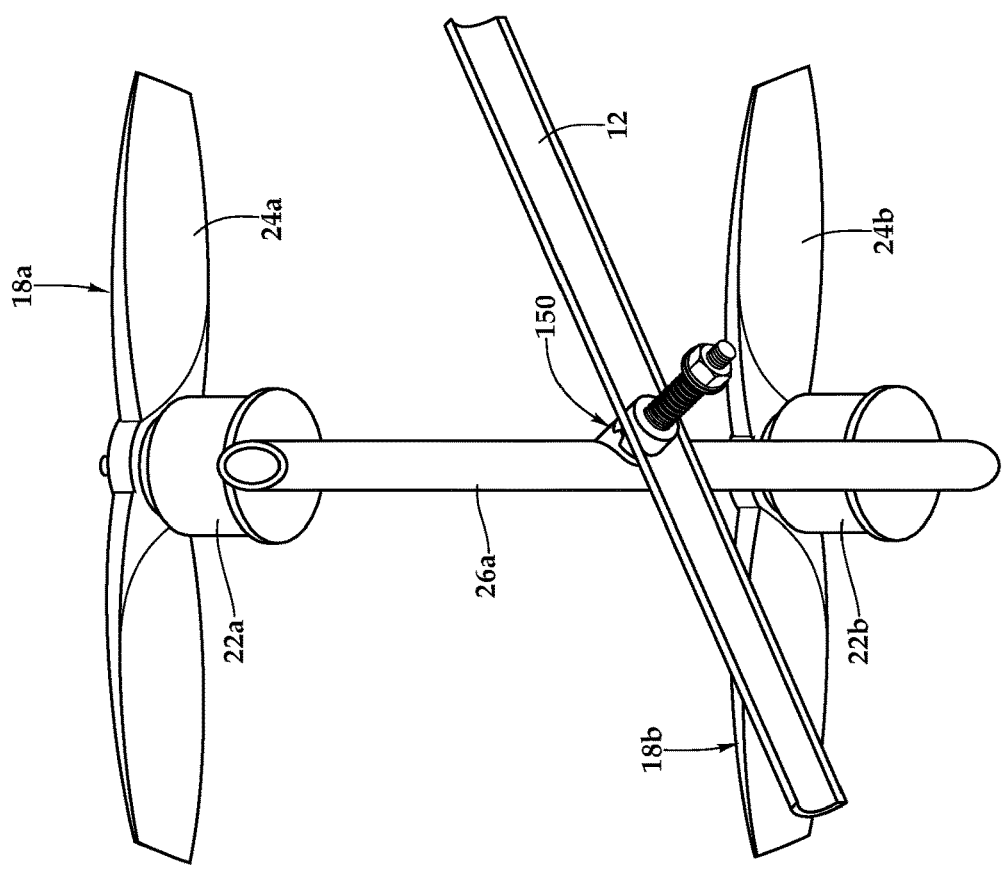
Figure 6E:
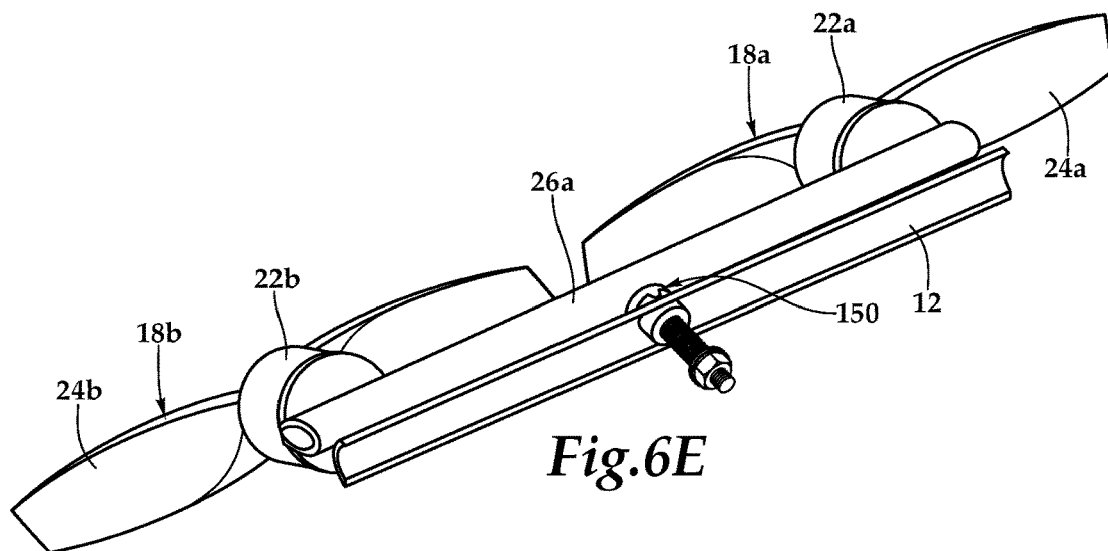
Figure 6D:
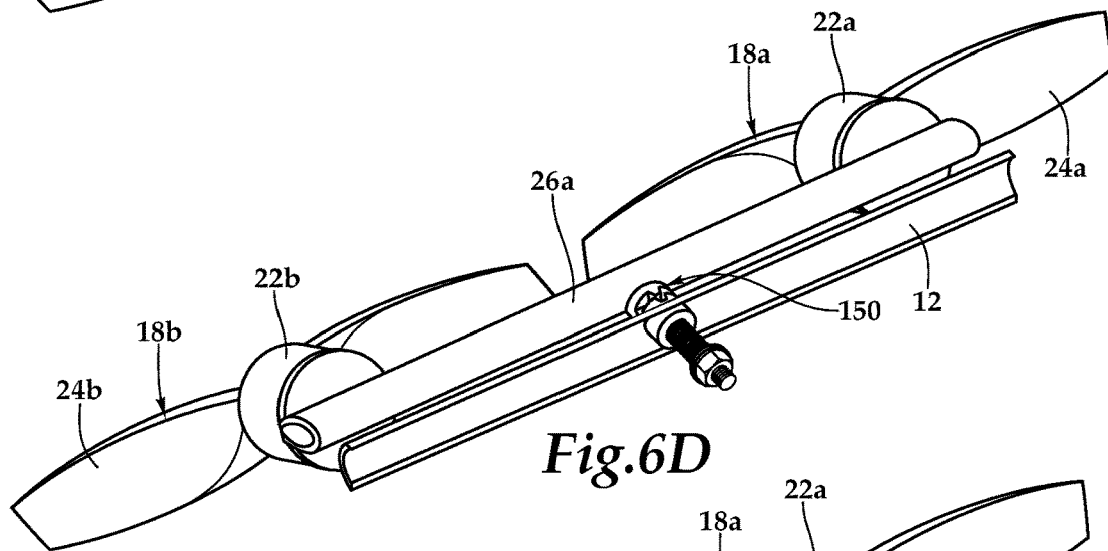
Figure 6C:
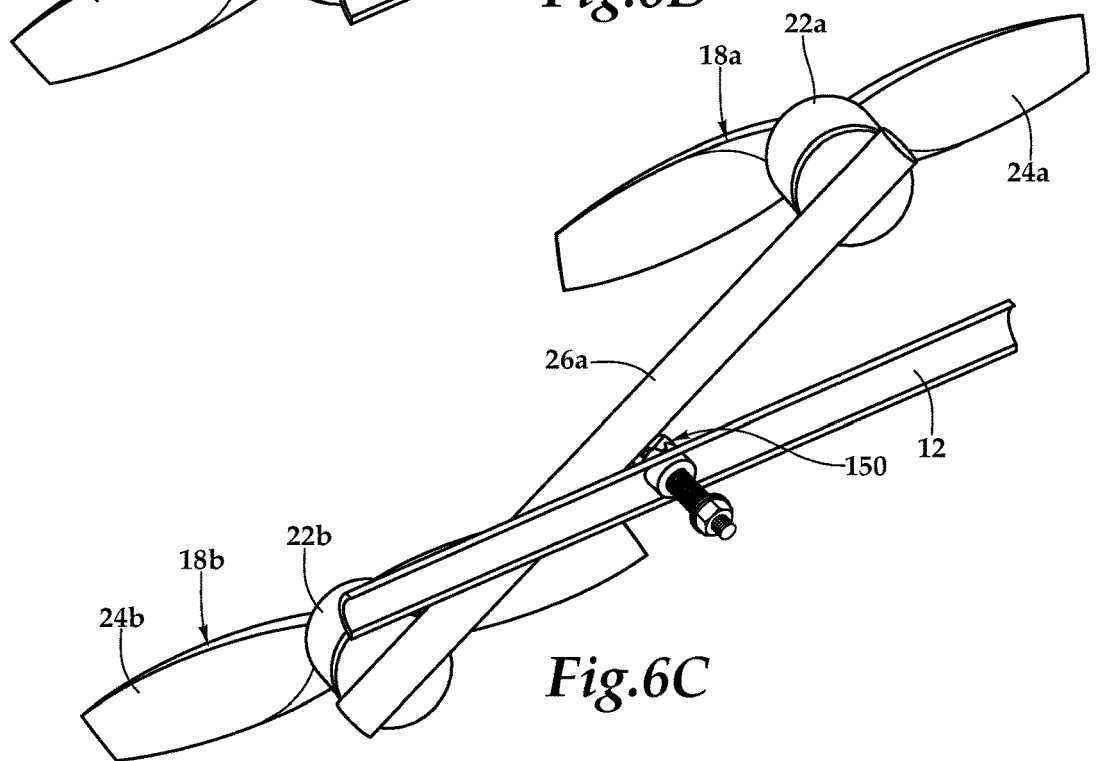
Figure 7C:
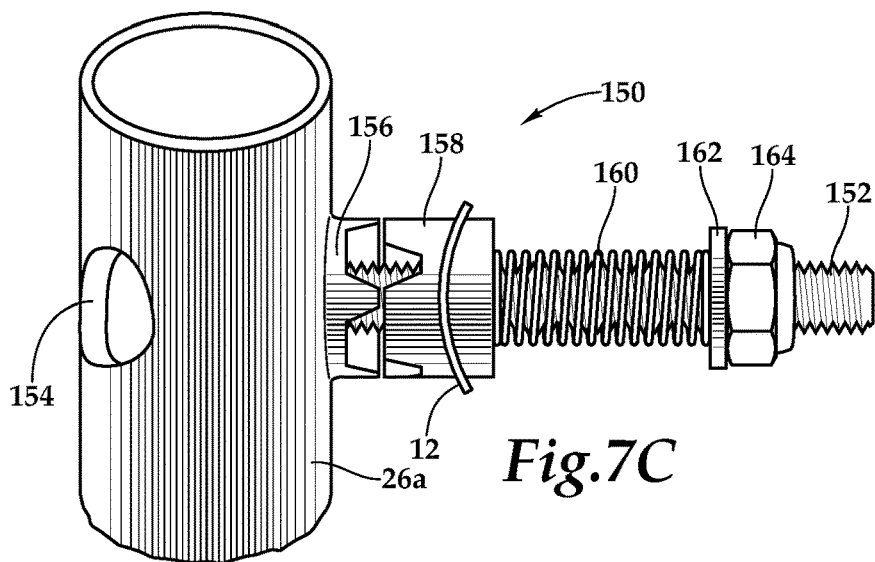
Figure 7B:
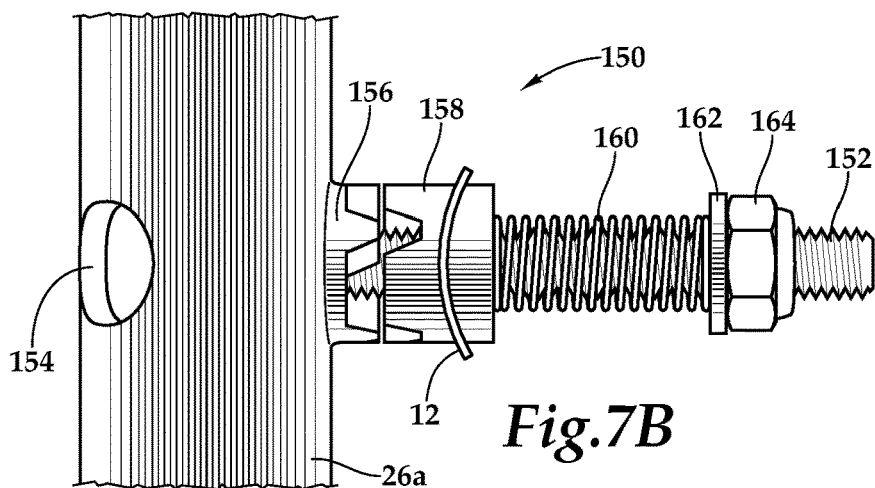
Figure 7A:
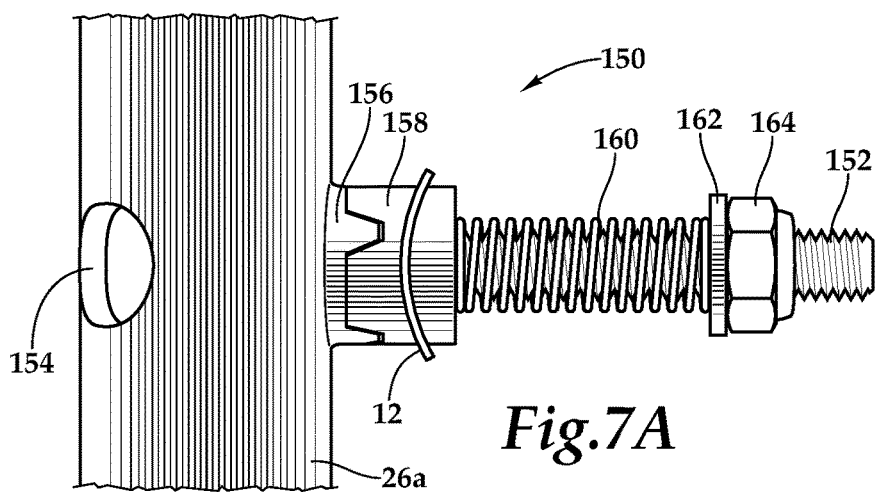

Referring next to FIGS. 6A-6E and 7A-7F, enlarged views showing the transition between the flight configuration and the compact storage configuration of aircraft 10 are depicted. In FIG. 6A, aircraft 10 is in flight configuration with motor mount 26a extending substantially perpendicular to the leading edge of airframe 12. In the flight configuration, locking joint 150 is in the engaged position preventing relative rotation between motor mount 26a and airframe 12, as best seen in FIG. 7A. When it is desired to transition from the flight configuration to the compact storage configuration of aircraft 10, locking joint 150 is actuated to a disengaged position, as best seen in FIGS. 6B and 7B. In this position, detent element 156 of motor mount 26a has separated from detent element 158 of airframe 12, no longer preventing relative rotation between motor mount 26a and airframe 12. In the illustrated embodiment, detent element 156 is integral with motor mount 26a and may be formed together as part of an additive process such as a three-dimensional printing process. Likewise, detent element 158 is integral with airframe 12 and may be formed together as part of an additive process such as a three-dimensional printing process. In other embodiments, detent element 156 may be non-integrally coupled to motor mount 26a and/or detent element 158 may be non-integrally coupled to airframe 12. Together, detent element 156 and detent element 158 may be referred to as a detent assembly.

Once detent element 156 of motor mount 26a has separated from detent element 158 of airframe 12, relative rotation between motor mount 26a and airframe 12 may occur, as best seen in the progression between FIGS. 6B-6D and 7B-7D. FIG. 6C may represent aircraft 10 during the transition from the flight configuration to the compact storage configuration wherein motor mount 26a has rotated approximately forty-five degrees relative to the leading edge of airframe 12. FIG. 6D may represent aircraft 10 during the transition from the flight configuration to the compact storage configuration wherein motor mount 26a has rotated an additional approximately forty-five degrees relative to the leading edge of airframe 12. In the illustrated embodiment, once detent element 156 of motor mount 26a has been rotated ninety degrees relative to detent element 158 of airframe 12, detent element 156 can again mesh with detent element 158, as best seen in FIGS. 6E and 7E. This represents the compact storage configuration of aircraft 10 wherein locking joint 150 is in the engaged position preventing relative rotation between motor mount 26a and airframe 12. In the illustrated embodiment, locking joint 150 is operable to be in the engaged position only at ninety degree increments of relative rotation of detent element 156 and detent element 158 and namely the flight configuration and the compact storage configuration of aircraft 10. In other embodiments, a locking joint may be operable to be in the engaged position at additional and/or alternative intervals.

When it is desired to transition from the compact storage configuration to the flight configuration of aircraft 10, locking joint 150 is actuated to a disengaged position, as best seen in FIGS. 6D and 7D. In this position, detent element 156 of motor mount 26a has separated from detent element 158 of airframe 12, no longer preventing relative rotation between motor mount 26a and airframe 12. Once detent element 156 of motor mount 26a has separated from detent element 158 of airframe 12, relative rotation between motor mount 26a and airframe 12 may occur, as best seen in the progression between FIGS. 6D-6B and 7D-7B. FIG. 6C may represent aircraft 10 during the transition from the compact storage configuration to the flight configuration wherein motor mount 26a has rotated approximately forty-five degrees relative to the leading edge of airframe 12. FIG. 6B may represent aircraft 10 during the transition from the compact storage configuration to the flight configuration wherein motor mount 26a has rotated an additional approximately forty-five degrees relative to the leading edge of airframe 12. In the illustrated embodiment, once detent element 156 of motor mount 26a has been rotated ninety degrees relative to detent element 158 of airframe 12, detent element 156 can again mesh with detent element 158, as best seen in FIGS. 6A and 7A. This represents the flight configuration of aircraft 10 wherein locking joint 150 is in the engaged position, preventing relative rotation between the compact storage configuration and the flight configuration.

Locking joint 150 is depicted in an exploded view in FIG. 7F, better revealing its component parts. In the illustrated embodiment, locking joint 150 includes a bolt 152 that is operable to be received through an opening 154 of motor mount 26a. The shank portion of bolt 152 is operable to be received through a second opening of motor mount 26a (not visible) that extends through detent element 156. The head portion of bolt 152 is not operable to be received through the second opening such that an anchoring relationship is created therebetween. Next, the shank portion of bolt 152 may be received through an opening of detent element 158, which is preferably integral with airframe 12, as discussed herein. Thereafter, a spiral wound compression spring 160 and a washer 162 may be located around the shank portion of bolt 152. Nut 164 may then be rotatably coupled with the shank portion of bolt 152 suitable compressing spring 160 such that spring 160 provides the desired force biasing detent element 158 toward detent element 156 to maintain locking joint 150 in the engaged position during flight operations of aircraft 10 but also allowing manual and/or automated actuation of locking joint 150 between the engaged and disengaged positions by compressing spring 160 for operating aircraft 10 between the compact storage configuration and the flight configuration, as discussed herein.

Figure 8B:
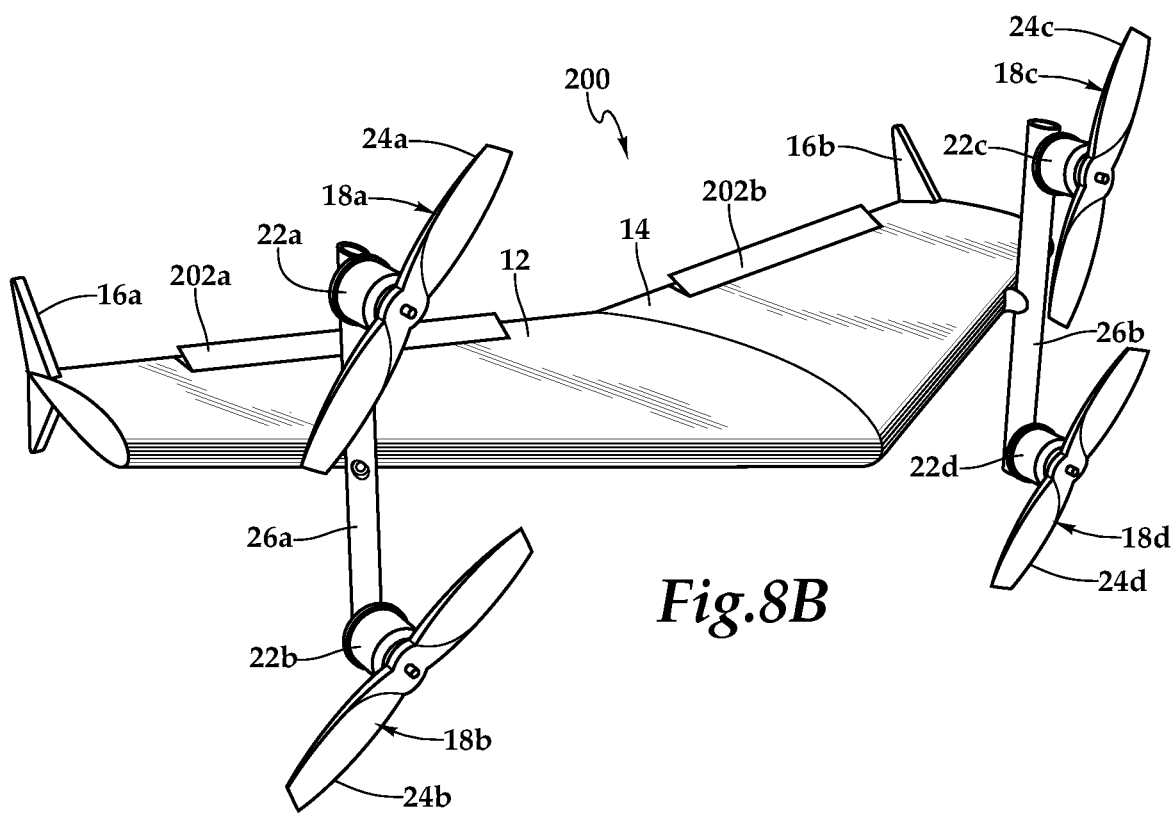
FIGS. 8A-8B are schematic illustrations of a flying wing aircraft in accordance with embodiments of the present disclosure.
Figure 8A:
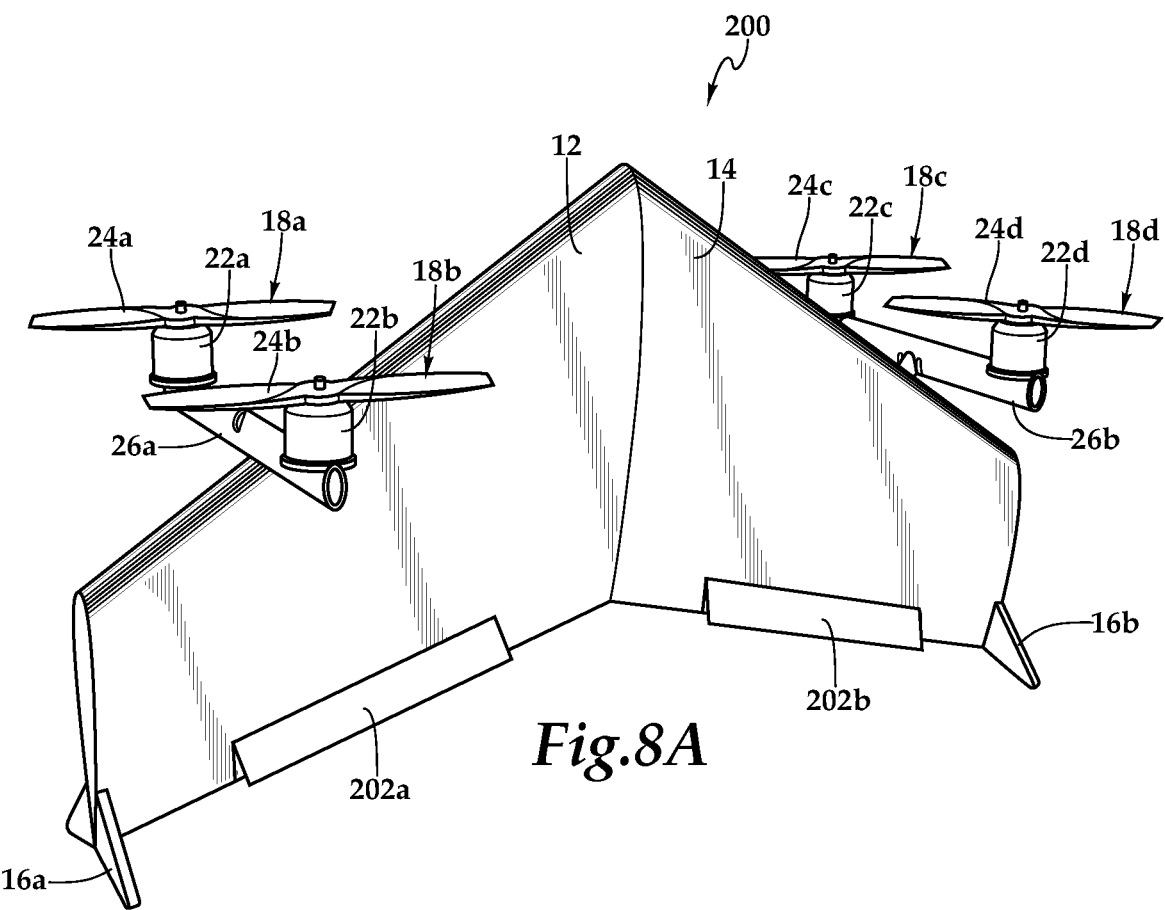

Referring to FIGS. 8A-8B in the drawings, various views of an unmanned aircraft system operable to transition between a flight configuration having a two-dimensional distributed thrust array and a compact storage configuration are depicted. The unmanned aircraft system is referred to herein as aircraft 200. FIG. 8A depicts aircraft 200 in a thrust-borne lift flight mode or the VTOL orientation and FIG. 8B depicts aircraft 200 in a wing-borne lift flight mode of the flying wing orientation. Aircraft 200 shares common elements with aircraft 10 which will be referred to herein with common reference numerals. In the illustrated embodiment, aircraft 200 has an airframe 12 depicted as a flying wing 14 that has an airfoil cross-section that generates lift responsive to the forward airspeed of aircraft 200 in the flying wing orientation of aircraft 200. Flying wing 14 has a swept wing design where the sweep angle progressively decreases from the leading edge to the trailing edge forming a tapered swept wing design. Preferably, airframe 12 is formed from a minimal number of components or sections each of which may be formed using an additive process such as by three-dimensional printing. Airframe 12 is preferably formed from a lightweight, high-strength material such as plastics, metals including aluminum, composites including fiberglass and/or carbon or other suitable material or combination of materials.

Aircraft 200 includes landing gear depicted as tail members 16a, 16b that enable aircraft 200 to operate as a tailsitting aircraft. In the flight configuration, aircraft 200 has a distributed thrust array including four propulsion assemblies 18a, 18b, 18c, 18d that are independently operated and controlled by the flight control system of aircraft 200, as discussed herein. In the illustrated embodiment, propulsion assembly 18a includes an electric motor 22a and a rotor assembly 24a, propulsion assembly 18b includes an electric motor 22b and a rotor assembly 24b, propulsion assembly 18c includes an electric motor 22c and a rotor assembly 24c and propulsion assembly 18d includes an electric motor 22d and a rotor assembly 24d. Each rotor assembly 24a, 24b, 24c, 24d is coupled to an output drive of a respective electrical motor 22a, 22b, 22c, 22d that rotates the rotor assembly 24a, 24b, 24c, 24d in a rotational plane to generate thrust for aircraft 200. In the illustrated embodiment, rotor assemblies 24a, 24b, 24c, 24d each include two rotor blades having a fixed pitch.

Propulsion assemblies 18a, 18b are coupled to a motor mount 26a and propulsion assemblies 18c, 18d are coupled to a motor mount 26b. Motor mounts 26a, 26b are rotatably coupled to the leading edge of airframe 12 to enable aircraft 10 to transition between the flight configuration and the compact storage configuration, as discussed herein. Unlike aircraft 10, aircraft 200 includes a pair of control surfaces depicted as aerosurfaces 202a, 202b. Aerosurfaces 202a, 202b preferably each have a split flap design including independent upper and lower flap elements that are operable for independent movement relative to one another and relative to flying wing 14. In wing-borne forward flight mode, aerosurfaces 202a, 202b may operate as traditional flaps to increase the lift provided by flying wing 14 at a given airspeed and/or increase the drag force. Aerosurfaces 202a, 202b may also operate as elevators to control the pitch and/or angle of attack of flying wing 14. In addition, aerosurfaces 202a, 202b may operate as ailerons to control the roll or bank of aircraft 200. Further, aerosurfaces 202a, 202b may be used to enhance hover stability in thrust-borne vertical lift mode.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An unmanned aircraft system having a compact storage configuration and a flight configuration in which the system is operable for thrust-borne lift in a VTOL orientation and wing-borne lift in a flying wing orientation, the system comprising:

an airframe having a leading edge, a trailing edge, a root chord, a first wingtip and a second wingtip, the leading edge extending from the root chord to each wingtip with a first sweep angle, the trailing edge extending from the root chord to each wingtip with a second sweep angle, the airframe having an airfoil cross-section along chord stations thereof;

a thrust array coupled to the airframe including first and second motor mounts coupled to the leading edge respectively between the root chord and the first and second wingtips, the first and second motor mounts rotatably coupled to the leading edge via first and second joints coupled to the leading edge, the motor mounts each having first and second propulsion assemblies coupled to respective first and second distal ends thereof;

an electric power system operably associated with the thrust array and operable to provide power to each propulsion assembly; and a flight control system operably associated with the thrust array and operable to independently control the speed of each propulsion assembly;

wherein, in the flight configuration, each motor mount is substantially perpendicular with the leading edge such that the airframe extends outboard of the first and second motor mounts and the thrust array forms a two-dimensional distributed thrust array; and wherein, in the compact storage configuration, each motor mount is substantially parallel with the leading edge extending substantially at the first sweep angle.

2. The unmanned aircraft system as recited in claim 1 wherein the first sweep angle is not congruent with the second sweep angle.

3. The unmanned aircraft system as recited in claim 1 wherein the first sweep angle is greater than the second sweep angle.

4. The unmanned aircraft system as recited in claim 1 wherein the airframe has a quarter chord sweep angle of between about 20 degrees and about 40 degrees.

5. The unmanned aircraft system as recited in claim 1 wherein the airframe has a quarter chord sweep angle of between about 25 degrees and about 35 degrees.

6. The unmanned aircraft system as recited in claim 1 wherein the airframe has a quarter chord sweep angle of about 30 degrees.

7. The unmanned aircraft system as recited in claim 1 wherein each propulsion assembly further comprises an electric motor and a rotor assembly.

8. The unmanned aircraft system as recited in claim 7 wherein each rotor assembly further comprises a fixed pitch rotor assembly.

9. The unmanned aircraft system as recited in claim 1 wherein the motor mounts are lockable relative to the leading edge of the airframe in the compact storage configuration and in the flight configuration.

10. The unmanned aircraft system as recited in claim 1 wherein the motor mounts are lockable relative to the leading edge of the airframe at ninety degree increments.

11. The unmanned aircraft system as recited in claim 1 wherein the electric power system further comprises one or more batteries and at least one power controller.

12. The unmanned aircraft system as recited in claim 1 wherein the flight control system is operable for autonomous flight control of the unmanned aircraft system.

13. The unmanned aircraft system as recited in claim 1 wherein the flight control system is operable to communicate with a remote station.

14. The unmanned aircraft system as recited in claim 1 further comprising a sensor system.

15. The unmanned aircraft system as recited in claim 14 wherein the sensor system further comprises a sensor array including one or more of an optical camera, a thermal camera, an infrared camera and a video camera.

16. The unmanned aircraft system as recited in claim 14 wherein the sensor system further comprises an intelligence, surveillance and reconnaissance module.

17. The unmanned aircraft system as recited in claim 1 further comprising a GPS module.

18. The unmanned aircraft system as recited in claim 1 further comprising a plurality of electronic speed controllers each operably associated with one of the propulsion assemblies.

19. The unmanned aircraft system as recited in claim 1 wherein the first and second motor mounts are forward of the leading edge.

20. An unmanned aircraft system having a compact storage configuration and a flight configuration in which the system is operable for thrust-borne lift in a VTOL orientation and wing-borne lift in a flying wing orientation, the system comprising:

an airframe having a leading edge, a trailing edge, a root chord, a first wingtip and a second wingtip, the airframe having an airfoil cross-section along chord stations thereof;

a thrust array coupled to the airframe including first and second motor mounts coupled to the leading edge respectively between the root chord and the first and second wingtips, the first and second motor mounts rotatably coupled to the leading edge via first and second joints coupled to the leading edge, the motor mounts each having first and second propulsion assemblies coupled to respective first and second distal ends thereof;

an electric power system operably associated with the thrust array and operable to provide power to each propulsion assembly; and a flight control system operably associated with the thrust array and operable to independently control the speed of each propulsion assembly;

wherein, in the flight configuration, each motor mount is substantially perpendicular with the leading edge such that the airframe extends outboard of the first and second motor mounts and the thrust array forms a two-dimensional distributed thrust array; and wherein, in the compact storage configuration, each motor mount is substantially parallel with the leading edge.

* * * * *